US011525936B2

(12) United States Patent
Wang et al.

(10) Patent No.: US 11,525,936 B2
(45) Date of Patent: Dec. 13, 2022

(54) THROUGH CASING FORMATION SLOWNESS EVALUATION WITH A SONIC LOGGING TOOL

(71) Applicant: Halliburton Energy Services, Inc., Houston, TX (US)

(72) Inventors: Ruijia Wang, Singapore (SG); Yao Ge, Singapore (SG); Xiang Wu, Singapore (SG); Jing Jin, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 297 days.

(21) Appl. No.: 16/905,359

(22) Filed: Jun. 18, 2020

(65) Prior Publication Data
US 2021/0396900 A1    Dec. 23, 2021

(51) Int. Cl.
*G01V 1/50* (2006.01)
*G01V 1/46* (2006.01)
*E21B 49/00* (2006.01)

(52) U.S. Cl.
CPC ............ *G01V 1/50* (2013.01); *E21B 49/00* (2013.01); *G01V 1/46* (2013.01); *G01V 2200/16* (2013.01);
(Continued)

(58) Field of Classification Search
CPC ........ G01V 1/50; G01V 1/46; G01V 2200/16; G01V 2210/1299; G01V 2210/1429; G01V 10/60; E21B 49/00
See application file for complete search history.

(56) References Cited

U.S. PATENT DOCUMENTS 5,214,251 A      5/1993   Orban et al.
2003/0018433 A1*  1/2003   Blanch .................... G01V 1/48
                                                              702/14
(Continued)

FOREIGN PATENT DOCUMENTS

EP       3179277 A1       6/2017
WO    2004/057372 A1      7/2004
(Continued)

OTHER PUBLICATIONS

Grosmangin, M., P. P. Kokesh, and Pd Majani. "A sonic method for analyzing the quality of cementation of borehole casings." Journal of Petroleum Technology 13.02 (1961): 165-171.
(Continued)

*Primary Examiner* — Regis J Betsch
(74) *Attorney, Agent, or Firm* — Kilpatrick Townsend & Stockton LLP

(57) ABSTRACT

Reducing casing wave effects on sonic logging data by positioning two or more receivers in a borehole in a subsurface formation; receiving, at two or more receivers in a borehole in a subsurface formation, a first signal associated with a first acoustic signal originating from a first transmitter position; receiving, at the two or more receivers, a second signal associated with a second acoustic signal originating from a second transmitter position; creating a dataset based on the first signal and the second signal; identifying casing wave signals in the dataset based at least in part on the second signal; calculating inverse-phase casing wave signals based at least in part on the casing wave signals and the second signal; and reducing effects of the casing wave signals on the dataset using the inverse-phase casing wave signals.

20 Claims, 13 Drawing Sheets

(52) U.S. Cl.
CPC ........... *G01V 2210/1299* (2013.01); *G01V 2210/1429* (2013.01); *G01V 2210/60* (2013.01)

(56) References Cited

U.S. PATENT DOCUMENTS

| | | | |
|---|---|---|---|
| 2003/0174581 A1 | 9/2003 | Parra et al. | |
| 2004/0122595 A1* | 6/2004 | Valero | G01V 1/48 702/11 |
| 2006/0070433 A1 | 7/2006 | Fredette et al. | |
| 2006/0233048 A1* | 10/2006 | Froelich | E21B 47/005 367/35 |
| 2014/0043938 A1 | 2/2014 | Sinha | |
| 2015/0168581 A1* | 6/2015 | Izuhara | E21B 47/005 702/9 |
| 2017/0226844 A1 | 8/2017 | Izuhara et al. | |
| 2017/0350231 A1 | 12/2017 | Merciu | |
| 2018/0284308 A1 | 10/2018 | Hirabayashi | |
| 2019/0017369 A1* | 1/2019 | Ameen | G01V 1/305 |
| 2019/0369285 A1 | 12/2019 | Fouda et al. | |
| 2020/0072036 A1* | 3/2020 | Wang | E21B 49/003 |
| 2020/0116007 A1 | 4/2020 | Mandal | |

FOREIGN PATENT DOCUMENTS

| | | | |
|---|---|---|---|
| WO | 2016/187242 A1 | 11/2016 | |
| WO | 2020/047459 A1 | 3/2020 | |
| WO | 2020/149826 A1 | 7/2020 | |

OTHER PUBLICATIONS

Kinoshita, Toshihiro, et al. "Feasibility and challenge of quantitative cement evaluation with LWD sonic." SPE Annual Technical Conference and Exhibition. Society of Petroleum Engineers, 2013.

Pistre, Vivian, et al. "Attenuation-Based Quantitative Cement Bond Index with LWD Sonic: A Novel Approach Applicable to all Casing and Cement Cases." SPE Annual Technical Conference and Exhibition. Society of Petroleum Engineers, 2014.

Izuhara, W., et al. "Full-range quantitative cement bond evaluation with LWD sonic: The right way of approach using a hybrid of amplitude and attenuation." SPE Annual Technical Conference and Exhibition. Society of Petroleum Engineers, 2017.

Tang, Xiaoming, Yuanda Su, and Bo Zhang. "A New Through-Casing Acoustic Logging Tool Using Dual-Source Transmitters." SPWLA 60th Annual Logging Symposium. Society of Petrophysicists and Well-Log Analysts, 2019.

Maslennikova, Yulia S., et al. "Spectral noise logging data processing technology." SPE Russian Oil and Gas Exploration and Production Technical Conference and Exhibition. Society of Petroleum Engineers, 2012.

Khalil, Ihab Nabil, et al. "Leak detection by temperature and noise logging." Abu Dhabi International Petroleum Conference and Exhibition. Society of Petroleum Engineers, 2012.

"Array Noise Tool (ANT)" Data Sheet, GoWellPro, found at https://static1.squarespace.com/static/5c5146db4eddecf7a88e4a5d/t/5d243a1d12c9e000010ce56d/1562655264082/WellIntegrity_ANT.pdf, Aug. 2017, 2 pages.

"Acoustic Conformance Xaminer® (ACX TM) Service" Data Sheet, Halliburton Well Assurance/Pipe Integrity, found at https://www.halliburton.com/content/dam/ps/public/lp/contents/Data_Sheets/web/H/Acoustic-Conformance-Xaminer.pdf?nav=en-US_wireline-perforating_public, Aug. 2016, 2 pages.

International Search Report and Written Opinion issued in related PCT Application No. PCT/US2021/021286 dated Jul. 1, 2021, 8 pages.

* cited by examiner

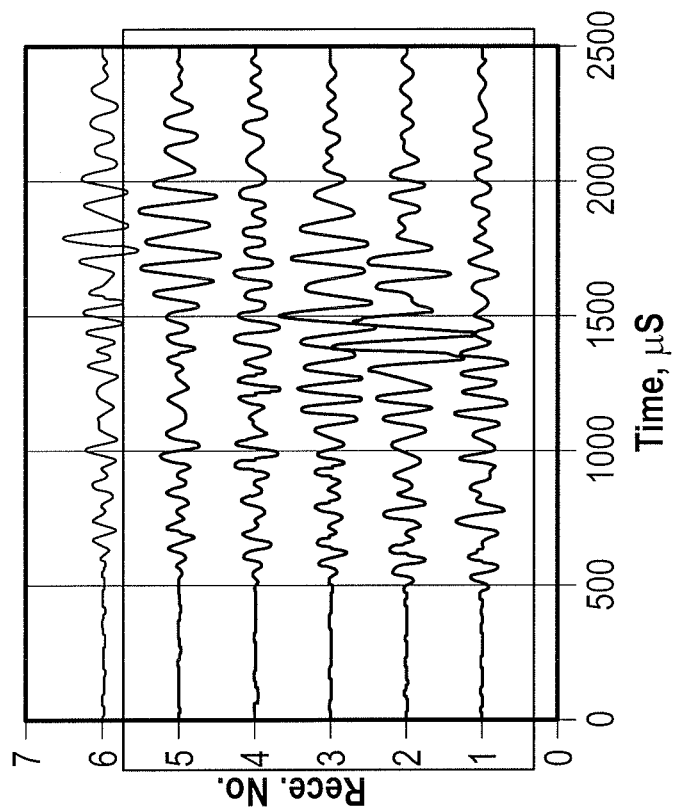
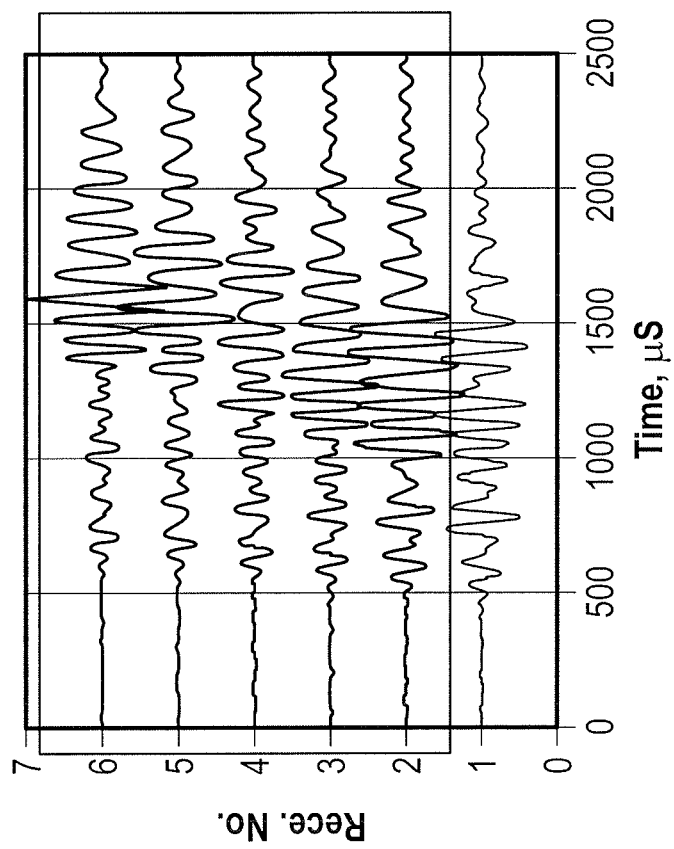
FIG. 5A
FIG. 5B

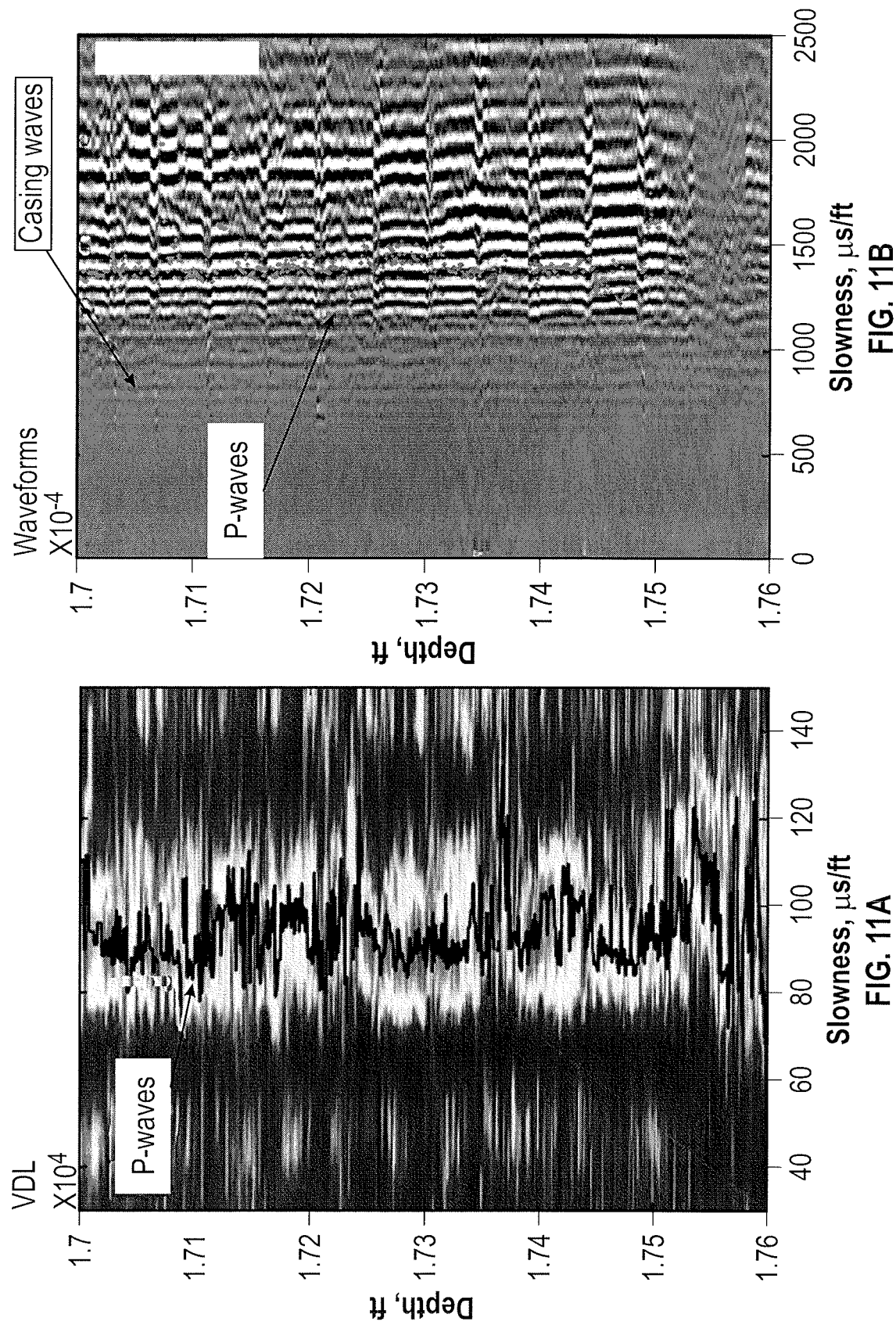

THROUGH CASING FORMATION SLOWNESS EVALUATION WITH A SONIC LOGGING TOOL

FIELD OF THE INVENTION

The present disclosure relates to a system and methods for logging properties of a geologic formation using well logging tools, and more specifically to reducing the effects of casing waves in a cased-hole while logging properties of a geologic formation.

BACKGROUND

Wellbores for hydrocarbon recovery are typically cased to ensure that the integrity of a wellbore is maintained during subsequent downhole operations. The cementing process involves mixing a slurry of cement, cement additives, and water, then pumping the mix down through the casing to the annulus which is the space formed between the casing and the wall of the wellbore. Cementing adds proper support for the casing and serves as a hydraulic seal. This hydraulic seal is particularly important in achieving zonal isolation and preventing fluid migration from various zones into groundwater resources.

Well logging tools record properties of a geologic formation. These well logging tools may comprise one or more transmitters and one or more receivers. The one or more transmitters may stimulate an acoustic wave into the geologic formation and the one or more receivers may also receive one or more waves produced in response to the transmitter-stimulated acoustic wave, including for example one or more formation waves and one or more casing waves. A sonic log may be used to store the acoustic data captures at the receivers and the data contained therein may be processed to extract various features. For example, the travel time of the acoustic wave from the transmitter to the receiver divided by the transmitter-receiver spacing, which may be called slowness. Sonic log data may also be used to support and calibrate processing, including, for example, derivation of porosity and other characteristics of the formation, lithologies identification, stratigraphic correlation, facies recognition, fracture identification, compaction identification, over-pressure identification, and source rock identification.

The one or more formation waves described in the sonic log may indicate one or more properties of the formation, including the presence of any type of fluid, including, but not limited to, a liquid (for example, production fluid such as any hydrocarbon), a drilling fluid (for example, mud), water, gas, any other fluid, and any combination thereof. However, when using conventional sonic logging processing methods including, for example, slowness time coherence (STC) processing or differential phase-time semblance (DPTS) processing, the one or more casing waves may obscure the one or more formation waves received by the receivers, particularly when the cement bond index is low. The cement-bond index is a qualitative indicator of the amount of cement filling the annulus between the casing and formation, which ranges from 0.0, indicating no cement or free casing, to 1.0, indicating the annulus is completely filled with high-quality cement. The cement bond index is also an important indication of the integrity of the well, as poor cementing may result in the flow of unwanted fluids, including for example gas and water, into the well, which may cause loss of potential oil and gas reserves and, in some cases, may cause blowouts at the wellhead.

Existing solutions involve the use of frequency-wave number (F-K) filters to reduce casing waves with certain slowness characteristics. These solutions may be somewhat effective when the slowness of the one or more formation waves differ substantially from the slowness of the one or more casing waves, but are otherwise ineffective and the application of F-K filters may bias the formation waves' slowness. Alternative solutions may use a median filter for a common-offset array to extract casing waves, based on the assumption the one or more formation waves arrive at different times, while the one or more casing waves arrive at the same time. However, median filters are ineffective at removing the casing waves when the bond condition changes with depth, and may in fact prevent analysis of the one or more formation waves measured in a homogenous formation.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

FIGS. 5A and 5B illustrate an exemplary set of data captures from the multi-shot data capture of a target zone, according to one or more aspects of the present disclosure.

FIGS. 11A and 11B illustrate exemplary modified waveforms and semblance VDL of a free-casing zone after application of the casing wave reduction method, according to one or more aspects of the present disclosure.

Figure 1A:
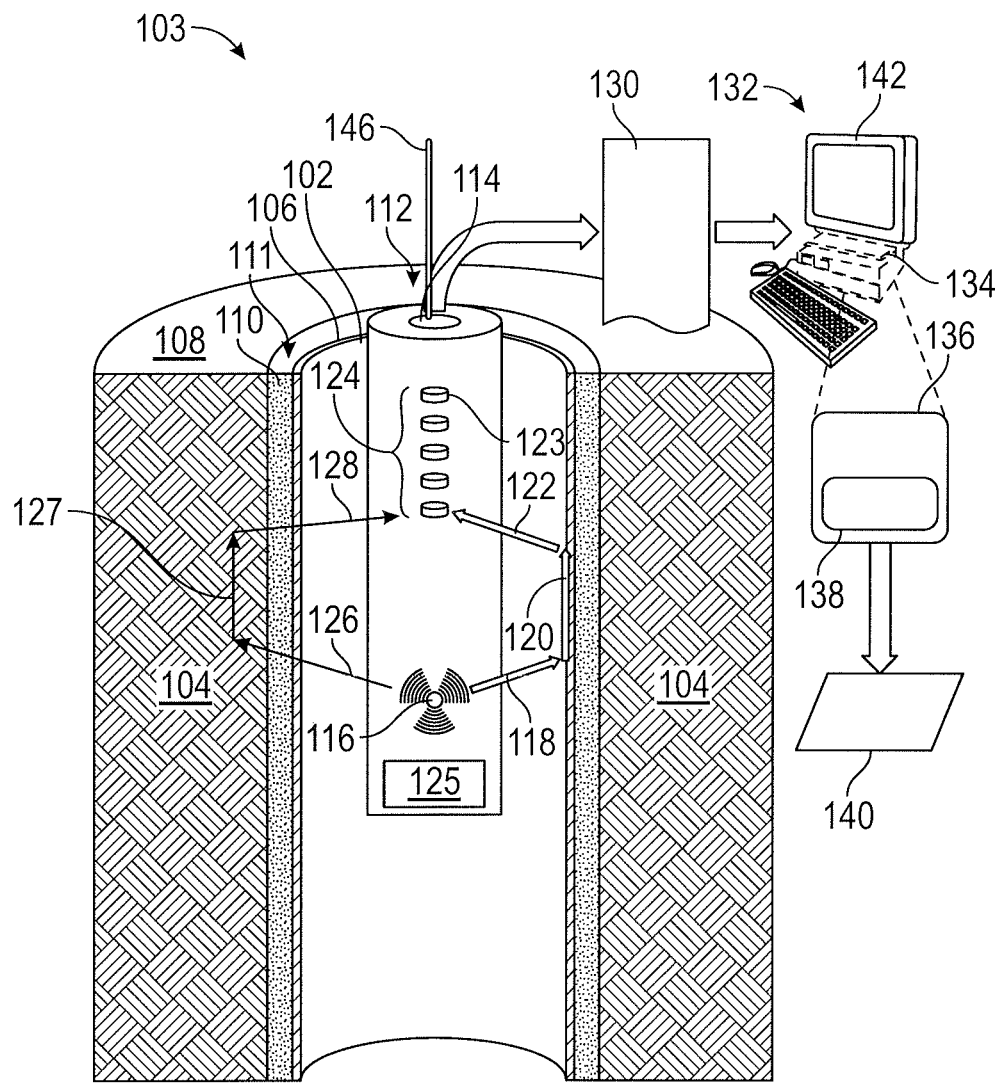
FIG. 1A depicts a partial cross-section view of an example casing wave reducing downhole tool as part of a logging operation, according to one or more aspects of the present disclosure.

While embodiments of this disclosure have been depicted and described and are defined by reference to exemplary embodiments of the disclosure, such references do not imply a limitation on the disclosure and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only and are not exhaustive of the scope of the disclosure.

DETAILED DESCRIPTION

The present disclosure relates to a system and methods for logging properties of a geologic formation using well logging tools, and more specifically to reducing the effects of casing waves while logging properties of a geologic formation.

Sonic logging is a procedure for assessing the characteristics of a borehole and the surrounding subsurface formation. In one or more embodiments, sonic logging involves acoustic waves that travel from a transmitter to the wellbore and return to one or more receivers to obtain information in the form of acoustic wave data. Various properties of the returning waves, such as the slowness, amplitude, attenuation, and phase may be assessed to obtain information about the wellbore and formation including without limitation the presence or absence of fluids, the compressional and shear slowness (delta-T) of the formation, the integrity of a cement bond, and leaks in one or more layers of the casing.

This disclosure provides a system and method for reducing the effects of casing waves on formation slowness evaluations. In one or more embodiments, multiple shots of sonic data are generated using one or more transmitters and collected using two or more of receivers, respectively. The multiple shots of sonic data are aligned and rearranged to generate a dataset, wherein the dataset comprises the raw sonic data waveforms. In one or more embodiments, the position of the one or more transmitters in one shot may be characterized as the primary transmitter position while the position of the one or more transmitters in other shots may be characterized as auxiliary transmitter positions. In one or more embodiments, the auxiliary transmitter positions may be used to generate inverse-phase signals, including for example inverse-phase casing wave signals, at the primary transmitter position. Specifically, the casing wave slowness and attenuation may be calculated based on the raw sonic data waveforms, and the casing wave slowness and attenuation may be used to generate inverse-phase signals, including for example inverse-phase casing wave signals, at the primary transmitter. In one or more embodiments, inverse-phase casing wave signals enable cancellation of the casing wave at the primary transmitter position, which may enable improved analysis of the formation wave.

Unlike frequency-wavenumber (F-K) filtering, which is ineffective when casing wave slowness is similar to formation wave slowness, and unlike median filtering, which is ineffective when bond conditions vary with depth, the present disclosure considers both the slowness and attenuation of waves to perform a casing wave reduction. This disclosure enables improved analysis when the casing wave and formation wave have similar slowness but differ in attenuation, which frequently occurs. Further, this disclosure does not bias estimates of formation wave slowness, which may occur using F-K filtering.

In one or more aspects of the present disclosure, a wellbore environment may utilize an information handling system to control one or more operations associated with the wellbore environment. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a sequential access storage device (for example, a tape drive), direct access storage device (for example, a hard disk drive or floppy disk drive), compact disk (CD), CD read-only memory (ROM) or CD-ROM, DVD, RAM, ROM, electrically erasable programmable read-only memory (EEPROM), and/or flash memory, biological memory, molecular or deoxyribonucleic acid (DNA) memory as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments of the present disclosure may be applicable to drilling operations that include but are not limited to target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subsurface formation. Embodiments may be applicable to injection wells, and production wells, including natural resource production wells such as hydrogen sulfide, hydrocarbons or geothermal wells; as well as wellbore or borehole construction for river crossing tunneling and other such tunneling wellbores for near surface construction purposes or wellbore u-tube pipelines used for the transportation of fluids such as hydrocarbons. Embodiments described below with respect to one implementation are not intended to be limiting.

FIG. 1A depicts a partial cross-section view of an example casing wave reducing downhole tool 112 as part of a logging operation in a wellbore environment 103, according to one or more aspects of the present disclosure a wellbore environment 103 including a downhole tool 112 for a logging operation, according to one or more embodiments. As depicted in FIG. 1A, wellbore environment 103 comprises a borehole 102 extending through various earth strata in a subsurface formation 104. The downhole tool 112 is disposed or positioned within the borehole 102. For example, the downhole tool 112 may be coupled to a conveyance component 114 for conveying the downhole tool 112 into the borehole 102. Conveyance component 114 may comprise a wireline 146. An annular casing 106 extends from the surface 108 into subsurface formation 104. Casing 106 provides a path through which one or more fluids travel from one or more downhole locations to the surface 108. Casing 106 may comprise one or more layers. In one or more embodiments, a log may be used to record measured data corresponding to any one or more layers of casing 106. In one or more embodiments, during cementing, the borehole 102 may be empty or filled with a fluid, such as a drilling fluid or uncured cement. The casing 106 may be attached or coupled to a wall of the borehole 102 via cement 110 pumped down from the surface 108 between the casing 106 and the wall of the borehole 102. In one or more regions of the borehole 102, the cement 110 may not be fully adhered to the casing 106. In one or more regions of the borehole 102, the casing 106 may be completely free of cement 110 depending on the location and time that the cement 110 has had to travel up the annulus 111 between the casing 106 and the borehole 102.

In one or more embodiments, downhole tool 112 comprises one or more receivers or sensors 123. A receiver array 124 may comprise a plurality of receivers 123. The one or more receivers 123 or the receiver array 124 may receive a signal, and provide the received signal to be processed to enable identification of data or signals within the received signal.

In one or more embodiments, downhole tool 112 comprises one or more transmitters 116. The one or more transmitters 116 transmit one or more signals (depicted with lines 118 and 126) within the wellbore 102. In one or more embodiments, the one or more signals comprise, for example, acoustic signals. The one or more transmitters may generate signals, for example and without limitation acoustic waves. The one or more transmitters may generate one or more source signals between 20 and 30 kilohertz (kHz), below 20 kHz, above 30 kHz, and any combination thereof. The transmitted signal 118 travels along the casing 106 as casing waves (depicted with line 120) and transmitted signal 126 travels through casing 106 and then travels along the formation 104 as formation waves (depicted with line 127) and consequently induce corresponding echo responses (depicted with lines 122 and 128). The one or more receivers 123 or receiver array 124 detect or monitor for the one or more echo responses 122, 128 associated with the one or more casing waves 120 and one or more formation waves 127 generated by the one or more source signals 118, 126 generated by the one or more transmitters 116. The one or more transmitters 116 may be utilized to scan the borehole 102 and formation 104. In one or more embodiments, the one or more transmitters 116 may be physically or digitally rotated. In one or more embodiments, the downhole tool 112 may be moved along the length of the borehole 102 to enable the one or more transmitters 116 to transmit signals in a plurality of positions.

In one or more embodiments, the downhole tool 112 comprises a memory 125 communicatively coupled to the one or more receivers 123 or the receiver array 124. Data associated one or more echo responses 122, 128 may be stored or recorded in the memory 125. In one or more embodiments, the downhole tool 112 may comprise an information handling system, for example, information handling system 500 of FIG. 5. The memory 125 may be communicatively coupled to or within an information handling system 132 at the surface 108. In one or more embodiments, memory 125 may be communicatively coupled to or within an information handling system disposed or positioned within the downhole tool 112 or any other downhole tool communicatively coupled to the downhole tool 112.

The formation wave 127 is a wave propagating along one or more of the formation 104 and the borehole 102 and may comprise one or more compressional waves, shear waves, and guided waves. The casing wave 120 is a wave propagating along the casing 106 lining the borehole. The casing wave 120 comprises a casing wave propagating factor and the formation wave 127 comprises a formation wave propagating factor. In one or more embodiments, the casing wave propagating factor may differ from the formation wave propagating factor.

A propagating factor of a wave may characterize a slowness and attenuation of the wave. The slowness indicates a time for a wave to travel a given distance and the attenuation indicates a reduction in the amplitude of the wave. The propagating factor may be written as a wavenumber of $k=\omega s+i\alpha$, where s is the slowness of the wave, $\alpha$ is the attenuation of the wave, and $\omega$ is the frequency of the wave. The casing wave 120 may have a propagating factor $k_{casing}$ and the formation wave 127 may have a propagating factor $k_{formation}$ depending on characteristics of the downhole tool 112 and geologic formation 104, respectively.

Figure 1B:
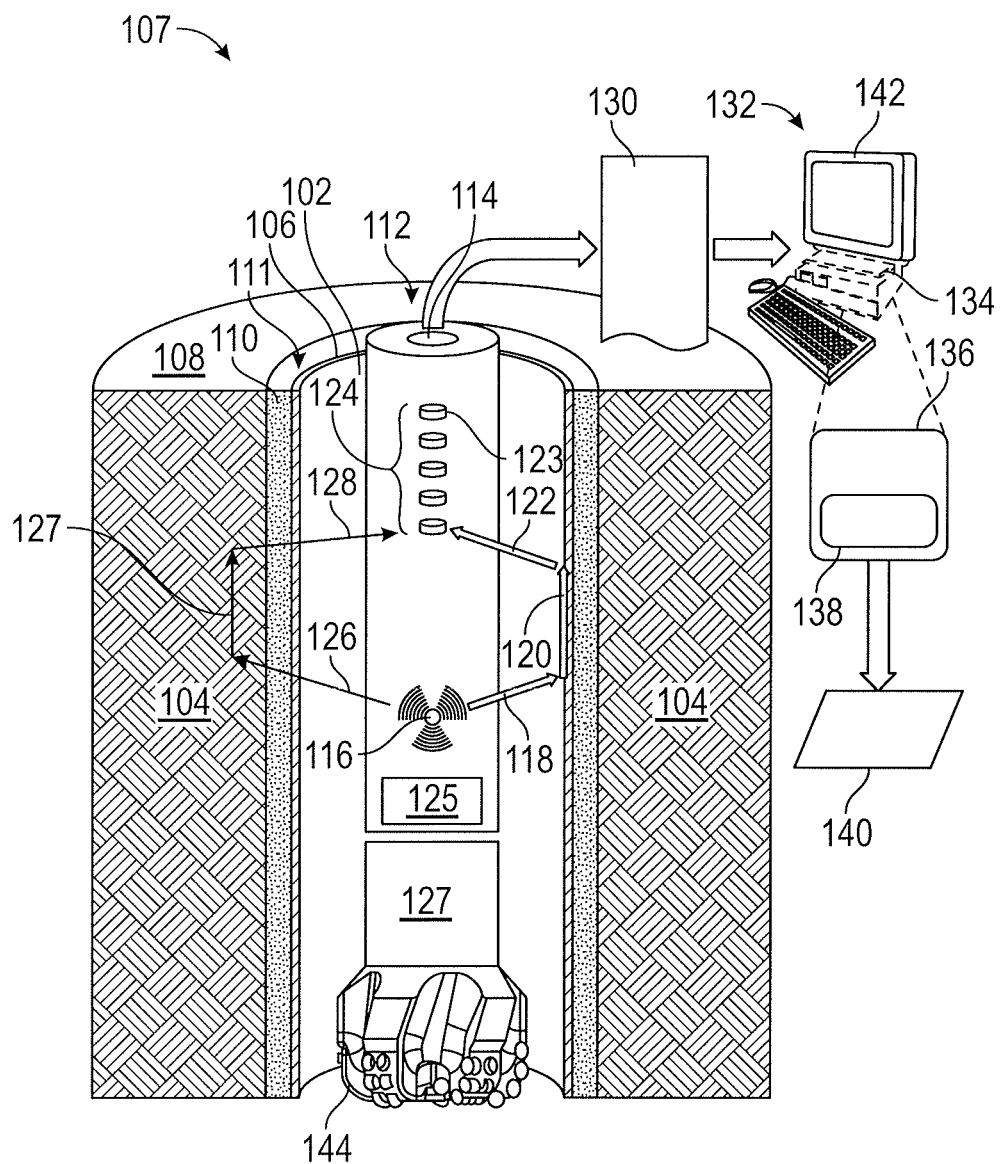
FIG. 1B depicts a partial cross-section view of an example casing wave reducing downhole tool as part of a drilling operation, according to one or more aspects of the present disclosure.

In one or more embodiments, the downhole tool 112 may be a logging-while-drilling tool (LWD) as illustrated in FIG. 1B, a measurement-while-drilling (MWD) as illustrated in FIG. 1B, any other sonic tool, a wireline tool as illustrated in FIG. 1A, any other downhole tool capable of housing one or more receivers 123 or receiver array 124. The one or more receivers 123 or the receiver array 124 may comprise any type of receiver, for example, a monopole receiver, a dipole receiver, a quadrupole receiver, any other multi-pole receiver, and any combination thereof.

Figure 12:
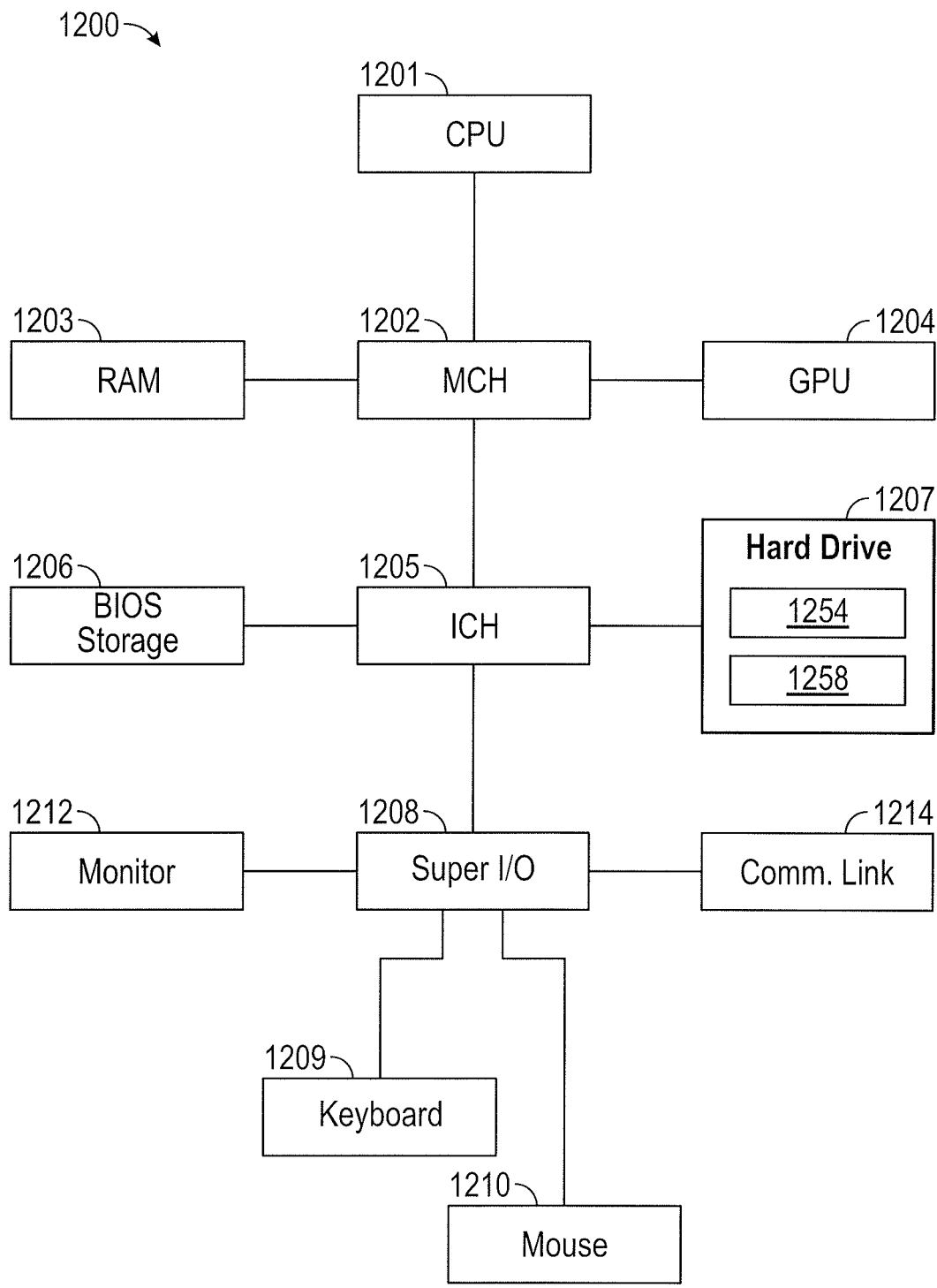
FIG. 12 is a schematic diagram of an information handling system for use with or in a wellbore environment, according to one or more aspects of the present disclosure.

In one or more embodiments, the one or more receivers 123 or the receiver array 124 may be communicatively coupled in lieu of or in addition to the memory 125 to an information handling system 132 at the surface 108. Information handling system 132 may be similar to or the same as the information handling system 1200 of FIG. 12. Data 130 from the one or more receivers 123 or the receiver array 124 may be communicated to the information handling system 132 via a wireline, a telemetry system, any other communication system and any combination thereof. The data 130 may be stored in a memory 1203 as discussed with respect to FIG. 12. The information handling system 132 may comprise a software application or program 134 stored in a non-transitory memory (for example, as illustrated in FIG. 12) that comprises one or more instructions executable by a processor for processing or analyzing the data 130. The software application or program 134 may comprise or be communicatively coupled to one or more modules, software applications or programs, data and any other software or systems collectively referred to as computer elements 136. Computer elements 136 may comprise processed data 138 from which one or more outputs 140 are generated. The one or more outputs 140 may be displayed on the monitor 142 of the information handling system 132. While FIG. 1A illustrates an information handling system 132 located at a surface 108, the present invention contemplates that the downhole tool 112 may comprise a computing device that executes one or more instructions of a software application or program similarly or the same as the software application or program 134.

The software application or program 134 may comprise a transmitter control program and a receiver control program. The transmitter control program may control transmission of the transmitted signals 118 from the one or more transmitters 116. The transmitted signal 118 may have one or more frequencies and one or more amplitudes. The receiver control program may control reception of the formation wave 127 and the casing wave 120 based on transmission of the transmitted signal 118. The receiver control program may be used to capture data and record a formation wave slowness and amplitude. The formation wave slowness and amplitude may change as a function of depth in the geologic formation 104. The formation wave slowness and amplitude may indicate formation properties in the formation 104 which can be used to determine a drilling direction for extraction of one or more fluids from the formation 104, as well as conditions in the borehole 102 such as integrity of cement 110 between the casing 106 and borehole 102 as a function of depth.

FIG. 1B depicts a wellbore environment 107 including a downhole tool 112 for a drilling operation, according to one or more embodiments. FIG. 1B is similar to FIG. 1A except that the downhole tool 112 of FIG. 1B comprises or is coupled to a bottom hole assembly (BHA) 125. BHA 125 is coupled to a drill bit 144. Conveyance component 114 may comprise a drill string. In one or more embodiments, the downhole tool 112 may be coupled to the drill string or imbedded as a component of the drill string. The BHA 127 operates the drill bit 144 through a drill bit motor or by rotating the entire string to drill into the subsurface formation 104. In one or more embodiments, drilling mud is forced through the interior of the drill string, and through the interior of the BHA 127. The drilling mud exits from the nozzles in the drill bit 144 and cools and lubricates the bit 144 and removes cuttings and carriers the cuttings to the surface 108 along the annulus of the borehole 102. The drilling mud may also serve as a communication medium of the telemetry to the surface 108, for example, to information handling system 132. By altering the flow of the drilling mud through the interior of the drill string, pressure pulses may be generated in the form of acoustic signals, in the column of drilling fluid. Moreover, by selectively varying the pressure pulses, signals can be generated to carry information indicative of downhole parameters, characteristics or conditions to the surface 108 for analysis.

It should be noted that while FIGS. 1A-B generally depict a land-based system, it is to be recognized that like systems may be operated in subsea locations as well.

Figure 2:
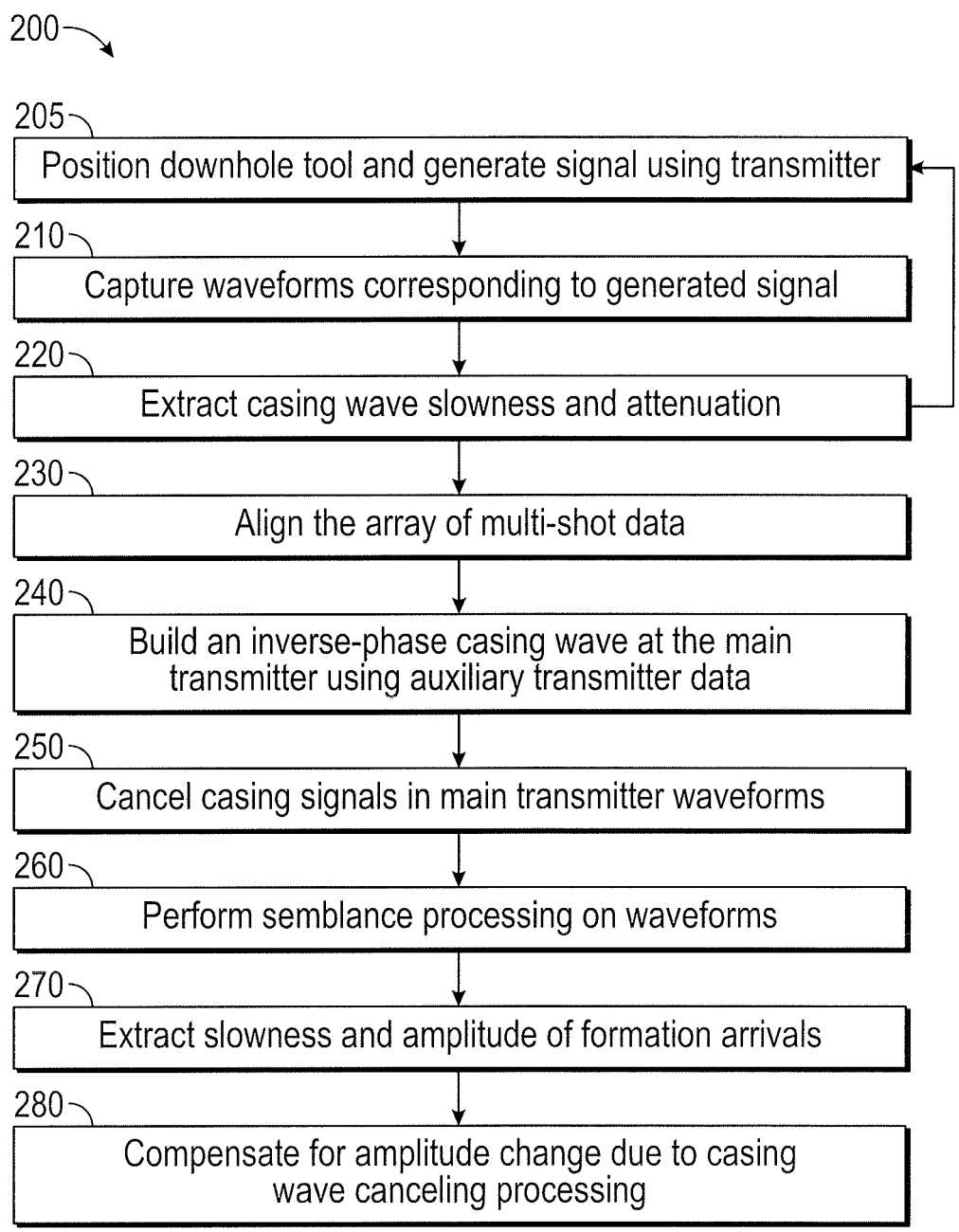
FIG. 2 is an exemplary flow diagram illustrating a casing wave reduction method, according to one or more aspects of the present disclosure.

FIG. 2 is an exemplary flow diagram illustrating a casing wave reduction method 200. In step 205, the downhole tool 112 may be positioned (or repositioned) within the wellbore 102 and the one or more transmitters 116 are used to stimulate an acoustic wave within the wellbore. As noted above, the acoustic wave may travel along the formation and along the casing. In step 210, the one or more receivers 123, receiver array 124, or both receive raw waveform data corresponding to the signal stimulated by the one or more transmitters 116, where the raw waveform data may comprise one or more casing waves and one or more formation waves, and the raw waveform data is stored. In one or more embodiments, the receivers 123, the receiver array 124, or both may store the raw waveform data locally. In one or more embodiments, the receivers may transmit the raw waveform data along a wireline to an information handling system at the surface. In step 220, the raw waveform data is analyzed to identify the one or more casing waves and the effects of the one or more casing waves on the raw waveform data. In particular, the casing wave slowness and attenuation are extracted from the raw waveform data. In one or more embodiments, steps 205, 210, and 220 may be repeated one or more times. In step 230, the data captured in step 210 and analyzed in step 220, which may be identified as a "shot" herein, is aligned to create a dataset.

In step 240, the position of the one or more transmitters in one shot may be characterized as the primary transmitter position while the position of the one or more transmitters in other shots may be characterized as auxiliary transmitter positions. An inverse-phase signal, including for example inverse-phase casing wave signal, is calculated at the primary transmitter position based at least in part on the waveforms captured at the auxiliary transmitter positions. In step 250, the inverse-phase signal, including for example inverse-phase casing wave signal, is used to modify the raw waveform data to reduce the effects of the casing wave at the primary transmitter position. In step 260, the modified waveforms are processed, using, for example, one or more of semblance processing and pair-wise waveform inversion. Semblance processing may comprise algorithms to extract slowness from the dataset, including, for example, STC processing and DPTS processing. Semblance processing may involve generating a two-dimensional (2D) semblance map of semblance values with slowness and time dimensions, where a peak on the semblance map represents arrival of a wave and wave slowness may be extracted by identifying the peak position on the semblance map. In step 270, the modified waveforms are processed further to extract the slowness and amplitude of the formation waves. In step 280, the modified waveform is further processed to compensate for reductions in formation wave amplitude as a result of the casing wave reduction method. The slowness and amplitude of formation waves identified using the method identified in FIG. 2 may be used to evaluate the formation's wave velocity and porosity, enable gas identification, lithology, fluid saturation, and rock strengths.

Figure 3:
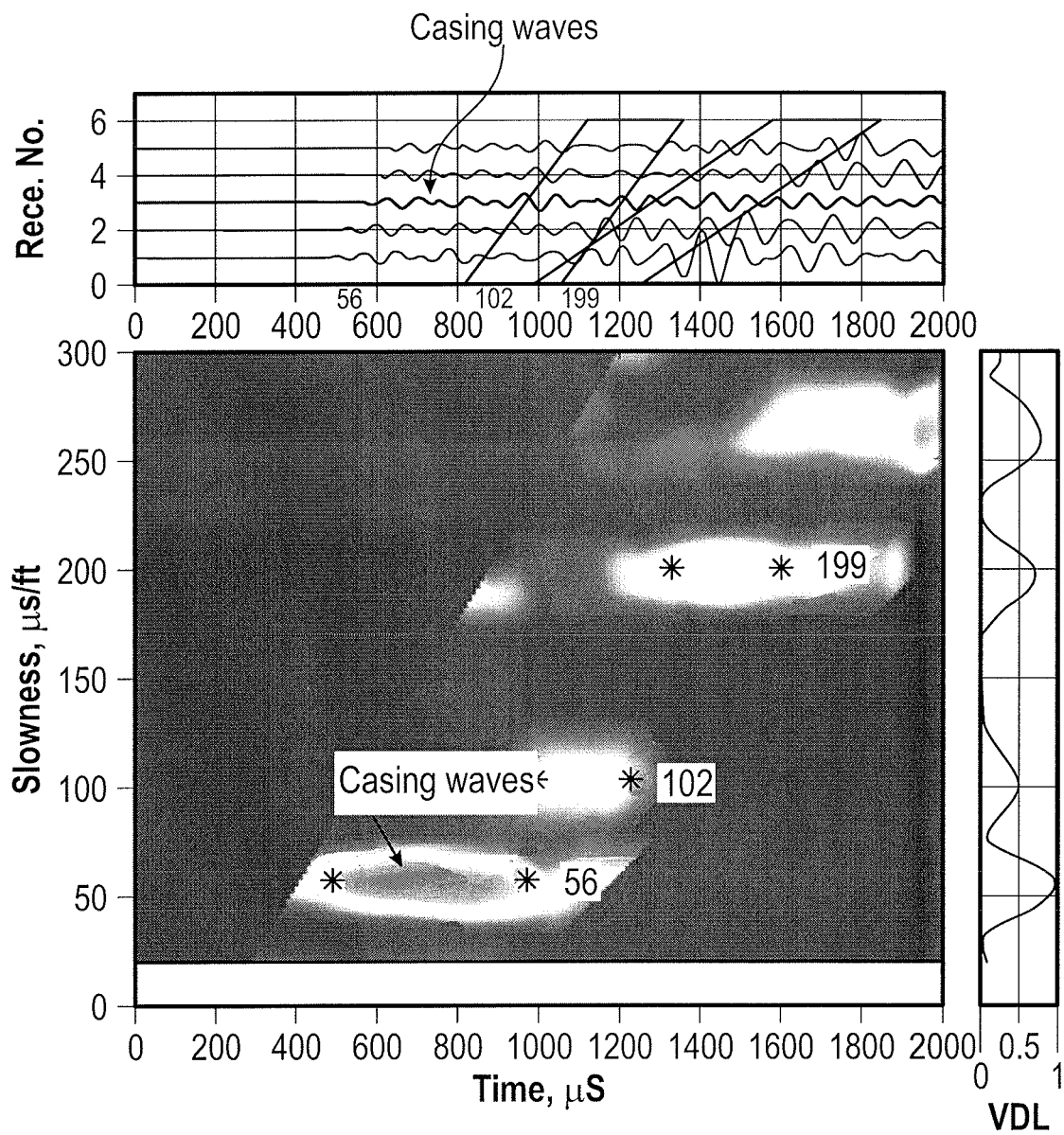
FIG. 3 is an exemplary illustration of casing wave identification in raw waveforms and a semblance map, according to one or more aspects of the present disclosure.

After capturing sonic data using the two or more receivers based on the stimulus produced at the primary transmitter, the raw data may be processed to identify one or more casing waves and one or more properties corresponding to the casing waves. FIG. 3 is an exemplary illustration of casing wave identification in raw waveforms and a semblance map. The lower portion of FIG. 3 illustrates the slowness of waveforms, measured in microseconds per foot, against time, measured in microseconds. The upper portion of FIG. 3 illustrates the amplitude of waveforms received at five receivers plotted over time, measured in microseconds. Processing, including without limitation pair-wise waveform inversion or semblance processing, may be used to identify casing waves in the raw data. This processing may enable identification of the speed or slowness of casing wave signals. For example, in FIG. 3, the peaks, shown by the lighter color portions of the lower figure, indicates peaks representing the arrival of certain waves, which may also be identified as modes. Additionally, the peak corresponding to casing waves is identified after processing at the point centered at approximately 56 microseconds per foot (μs/ft) (approximately 183 microseconds per meter (μs/m)) and between times 400 μs and 1000 μs. After identifying the slowness of the casing waves, further processing may enable calculation of the casing wave attenuation using, for example and without limitation, the root-mean-square or the envelope of the waveforms or the least-square fit of the amplitude of the waveform at different receivers. The slowness and attenuation of the casing waves may be used to predict casing waves generated at the primary transmitter position. In the upper portion of FIG. 3, the areas between the parallel lines extending from identifiers 102 and 199 correspond to the slowness peaks identified at 102 μs/ft (approximately 334 μs/m) and 199 μs/ft (653 μs/m) in the lower portion of the figure. In FIG. 3, identifier 102 corresponds to compressional waves with a slowness of 102 μs/ft (approximately 334 μs/m) and identifier 199 corresponds to Stoneley waves with a slowness value of 199 μs/ft (653 μs/m). The arrow pointing to receiver three, labeled casing waves, indicates receiver three is operating as the reference receiver, where the travel times in the waveform plot illustrated in the lower portion of FIG. 3 correspond to the travel time of waves from the transmitter to receiver three. The arrow labeled "Casing waves" is pointing to the first few cycles of a waveform received at receiver three, which correspond to the casing waves arrival at receiver three with a slowness of approximately 56 μs/ft.

In one or more embodiments, the process outlined above may be repeated one or more additional portions along the wellbore, where each of these may be characterized as a "shot." Multiple shots may be captured corresponding to a particular portion of the wellbore, for example, a target zone, where the target zone is a depth range of the formation faced by the one or more receivers 123 or receiver array 124. For example, the downhole tool 112 may be placed in a first portion of the wellbore for the first shot to capture an initial data capture. Then the downhole tool 112 may be shifted to a new portion of the wellbore that partially or substantially overlaps with the portion of the wellbore captured in the first shot. In one or more embodiments, the downhole tool 112 may be moved a distance called a shot depth, and the receivers may be equally spaced the same shot depth distance from one another such that multiple receivers in one shot overlap with the same positions of receivers in a previous shot. In one or more embodiments, dynamic logging may be performed, where dynamic logging comprises logging the well from bottom to top rather than logging data in a series of shots. With dynamic logging, a particular set of data may be identified as the primary shot, and other data corresponding to another depth may be identified as the second shot, and so on. In one or more embodiments, if data corresponding to a particular depth is unavailable, data at that depth may be interpolated from the existing data to construct data at that particular depth.

Figure 4:
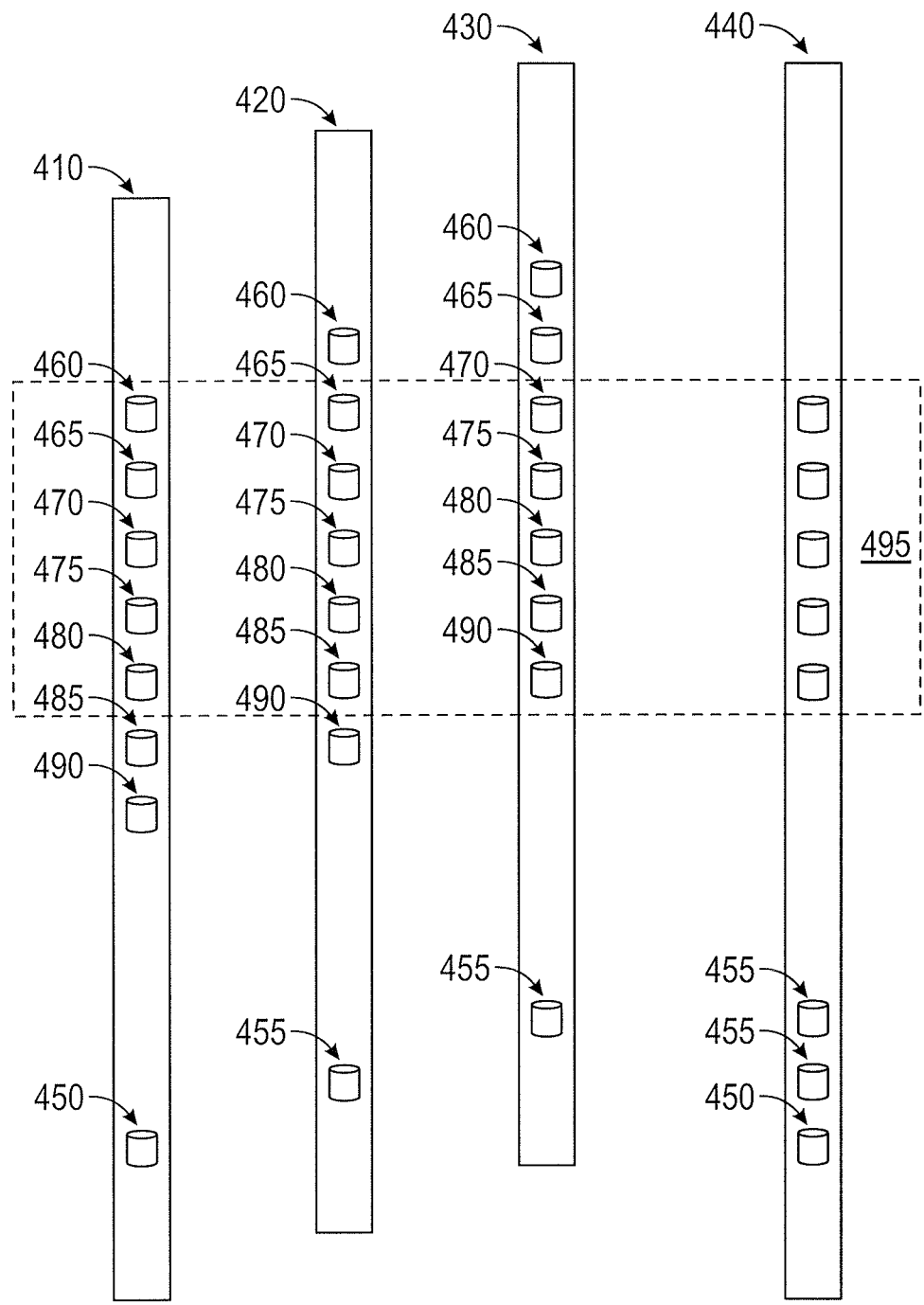
FIG. 4 is an exemplary illustration of multi-shot data capture of a target zone using multiple receivers, according to one or more aspects of the present disclosure.

FIG. 4 is an exemplary illustration of multi-shot data capture of a target zone using multiple receivers. For example, FIG. 4 shows a process involving three shots 410, 420, 430, where seven receivers 460, 465, 470, 475, 480, 485, 490 are used to capture sonic data in the wellbore. As shown in FIG. 4 and noted above, the shot depth is approximately equal to the receiver spacing. In one or more embodiments, if the shot depth is not equal to the receiver spacing, that depth may be interpolated based on sonic data at one or more other depths. Thus, receivers 460, 465, 470, 475, 480 of the first shot 410 are in the target zone overlap with receivers 465, 470, 475, 480, 485 of the second shot 420 and receivers 470, 475, 480, 485, 490 of the third shot 430. Consequently, data from the target zone 495 is captured using five receivers across each of the three shots. As shown in FIG. 4, the position of the transmitter 450 in the first shot 410 may be characterized as the primary transmitter position, and the position of the transmitter 455 in the second shot 420 and position of the transmitter 455 in the third shot 430 may be characterized as auxiliary transmitter positions. The auxiliary transmissions 455 may be used to predict and thereby reduce the effects of the casing wave at the primary transmitter position 450. Note that FIG. 4 uses three shots 410, 420, 430 to capture sonic data that may be assembled into a dataset, wherein the dataset comprises the raw sonic data waveforms. In one or more embodiments, implementation of this disclosure may require two or more shots. For example and without limitation, if two shots are utilized, one shot may be characterized as the primary shot and the other shot may be characterized as the auxiliary shot. In one or more embodiments, the transmitter position disposed or positioned at a distal end of the downhole tool may be characterized as the primary transmitter position, and the transmitter or transmitters disposed or positioned at a proximal end of the downhole tool may be characterized as the auxiliary transmitter position or positions. In one or more embodiments, the transmitter may be moved to one or more auxiliary positions without repositioning the receivers. In one or more embodiments, sonic data may be interpolated based on the dataset. For example, shot 440 shot illustrates receivers in fixed positions while transmitter 450 transmits at a primary transmitter position and transmitters 455 transmit at auxiliary transmitter positions. In one or more embodiments, one transmitter may be used to transmit at the primary transmitter position 450 and one or more transmitters may be used to transmit at the auxiliary transmitter positions 455. While FIG. 4 illustrates using seven total receivers and using five receivers in the target zone for the three shots, the present disclosure contemplates using any plurality of receivers and any plurality of shots.

FIGS. 5A and 5B illustrate an exemplary set of data captures from the multi-shot data capture of a target zone, wherein the amplitude of a waveform is shown for each receiver. Two shots are shown, where the first shot, shown in FIG. 5A, was captured at a greater depth in the borehole than the second shot, shown in FIG. 5B. Consequently, receivers two through six of the first shot and receivers one through five of the second shot align with the target zone of the formation zone. Accordingly, the first shot may be characterized as the primary shot and the second shot may be characterized as the auxiliary shot. Using the auxiliary shot, the casing wave signals affecting the primary shot may be predicted using equation one below, where N is the number of auxiliary shots:

$$Wav'_{casing}(t) = -\sum_{n=1}^{N} \text{Weight}(n)$$
$$Wav^n_{Aux}(t - s_{casing}(z_{Pri} - z^n_{Aux})) * 10^{-\alpha_{casing}(z_{Pri} - z^n_{Aux})/20}.$$

Equation 1

In Equation 1, Weight(n) is the weighting function for different auxiliary shots, $s_{casing}$ and $\alpha_{casing}$ are the casing wave slowness and attenuation, respectively. The z values, $z_{Pri}$ and $z^n_{Aux}$, are the offsets of the primary and auxiliary transmitter. Waveform data at the same depth may be used for predicting casing wave signals. For example and without limitation, casing wave signals at receiver two of the primary shot may be predicted by receiver one waveforms of the auxiliary shot, casing wave signals at receiver three of the primary shot may be predicted by receiver two waveforms of the auxiliary shot, and so on. Consequently, phase-inverse casing wave signals at receivers two through six in FIG. 5A are predicted by waveforms associated with receivers one through five in FIG. 5B using the above equation.

Figure 6:
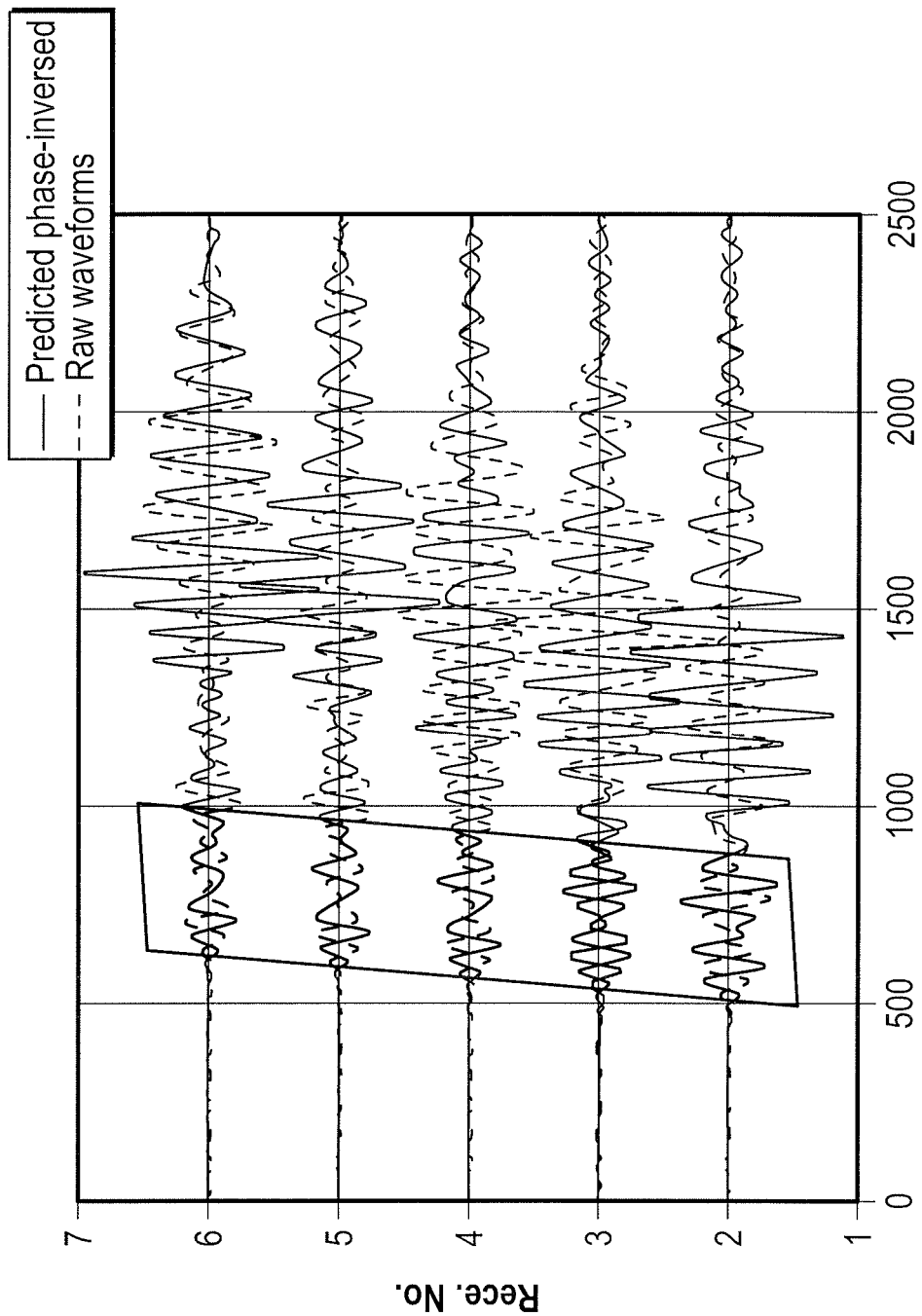
FIG. 6 is an exemplary comparison between raw waveform data and predicted phase-inverse casing waveform data, according to one or more aspects of the present disclosure.

FIG. 6 is an exemplary comparison between raw waveform data and predicted phase-inverse casing waveform data. The predicted phase-inverse casing waveform data may be determined or produced using Equation 1 from the data in FIG. 5B. For example and without limitation, FIG. 6 shows $s_{casing}$ and $\alpha_{casing}$ are 56 μs/ft (approximately 183 μs/m) and 0.5 decibels per foot (dB/ft) (approximately 1.64 decibels per meter (dB/m)), respectively. FIG. 6 illustrates how the predicted signals capture the effects of the casing waves on the raw waveforms. The dashed line illustrates the phase-inverse casing wave calculated using the equation above using a single auxiliary receiver. For example, using FIG. 4 as an example, the receiver at position 485 in the second shot 420 may be used to predict casing waves received at position 480 in the first shot 410; the receiver at position 480 in the second shot 420 may be used to predict casing waves received at position 475 in the first shot 410; the receiver at position 475 in the second shot 420 may be used to predict casing waves received at position 470 in the first shot 410; and so on. Likewise, and continuing to use FIG. 4 as an example, the receiver at position 490 in the third shot 430 may be used to predict casing waves received at position 480 in the first shot 410; the receiver at position 485 in the third shot 430 may be used to predict casing waves received at position 475 in the first shot 410; the receiver at position 480 in the third shot 430 may be used to predict casing waves received at position 470 in the first shot 410; and so on The summation of the original waveform (illustrated by the solid line) with the dashed line will remove the casing waves from the original waveform in that outlined region.

As noted above, the summation of the raw waveforms and the predicted casing wave signals produces waveforms in which the casing wave has been canceled, as shown in Equation 2 below:

$$\text{Wav}'(t) = \text{Wav}_{Raw}(t) + \text{Wav}_{casing}(t)$$

Equation 2.

Figure 7:
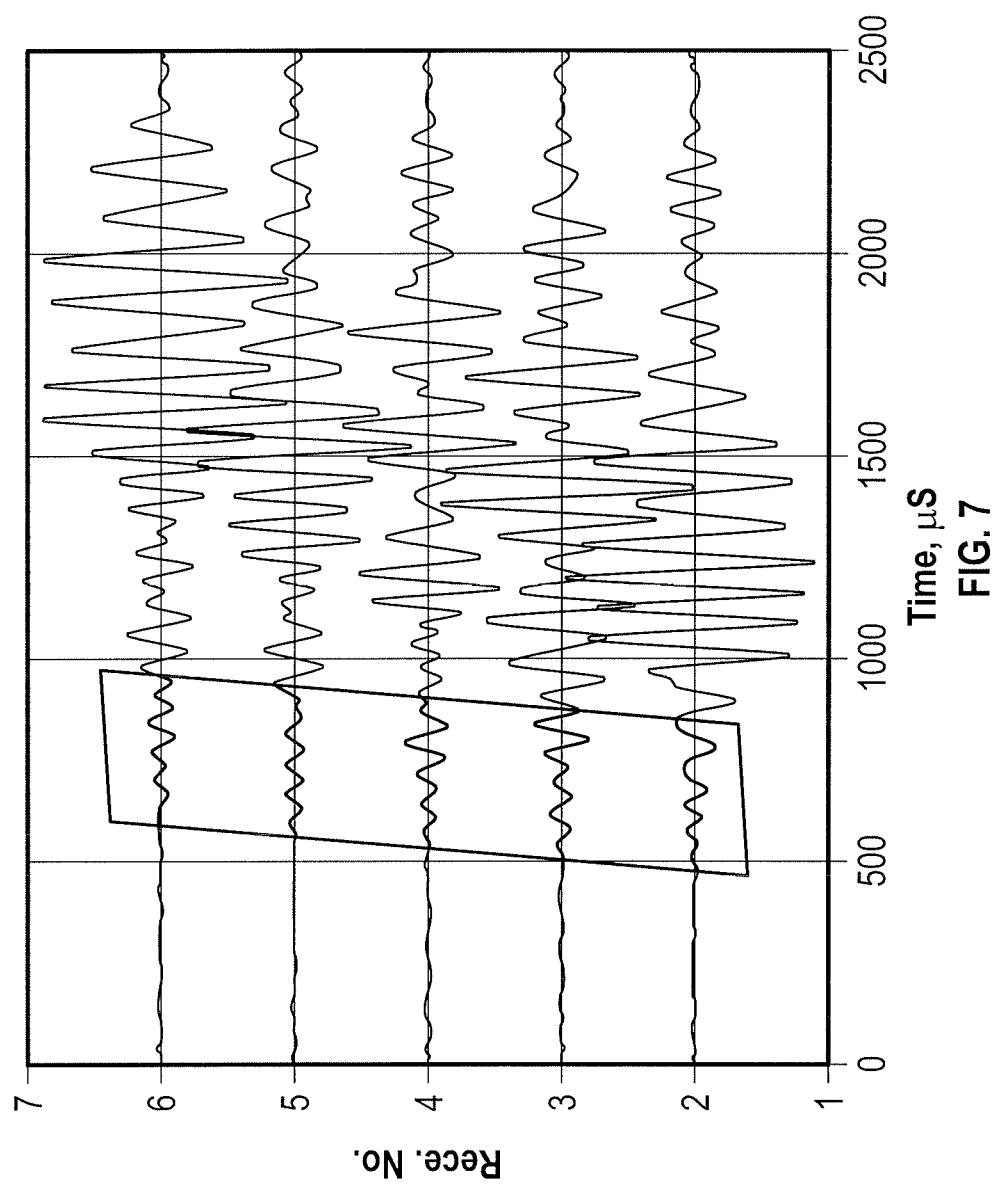
FIG. 7 shows an exemplary set of modified waveforms after application of the casing wave reduction method based on the waveforms in FIG. 6, according to one or more aspects of the present disclosure.

FIG. 7 shows an exemplary set of modified waveforms after application of the casing wave reduction method based on the waveforms in FIG. 6. FIG. 7 illustrates the casing wave amplitude is highly suppressed, as shown by the reduced amplitude of the waveforms in the outlined portion of FIG. 7 in comparison with the amplitude of the waveforms in FIG. 6. Processing the modified waveforms may emphasize the wave slowness and amplitude of the formation waveform. For example, DPTS processing may be used to generate a semblance map to illustrate the modified wave slowness on the semblance map. However, in one or more embodiments, the casing wave reduction method may reduce the amplitude of the resulting modified waveforms, including the amplitude of the formation wave. Accordingly, the amplitude reductions to the modified waveforms can be calibrated to limit the effects of the amplitude reductions before evaluation of the formation wave. The amplitude of formation waves in the modified waveforms may be useful in understanding the bonding index of the cement-formation interface.

Figure 8:
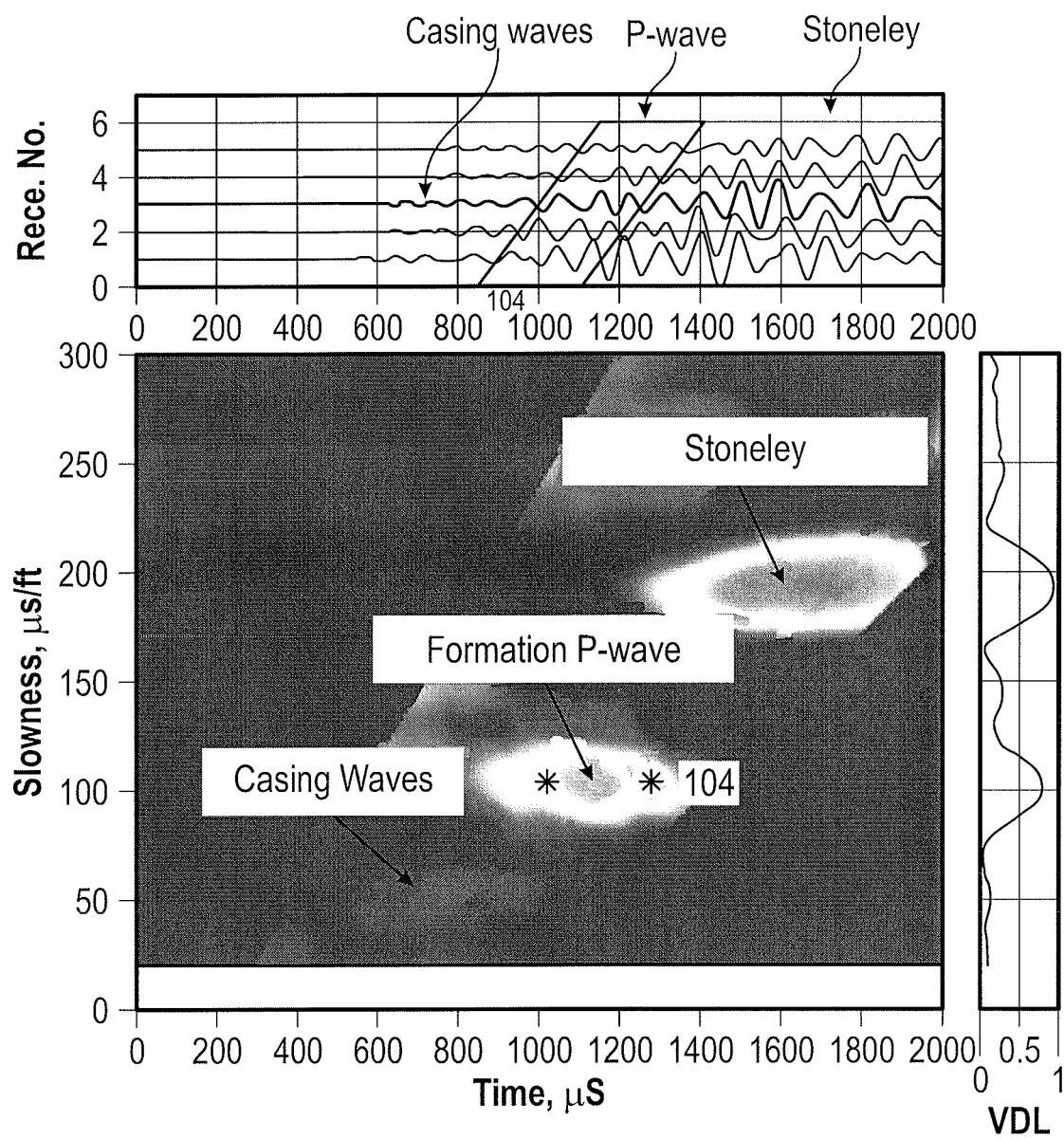
FIG. 8 is an exemplary illustration of a semblance map after application of the casing wave reduction method, according to one or more aspects of the present disclosure.

FIG. 8 is an exemplary illustration of a semblance map after application of the casing wave reduction method. For example, FIG. 8 shows semblance processing results of the waveform in FIG. 3 after application of the casing wave reduction method. FIG. 8 illustrates the casing waves of FIG. 3 have been canceled using the casing wave reduction method, and the formation compressional waves and Stoneley waves, at peaks with slowness values of 104 μs/ft (approximately 341 μs/m) and 199 μs/ft (653 μs/m), respectively, and identified using arrows labeled "Formation P-wave" and "Stoneley," respectively, are more accurate and coherent than they appeared in the raw waveform data shown in FIG. 3.

Figures 9A, 9B:
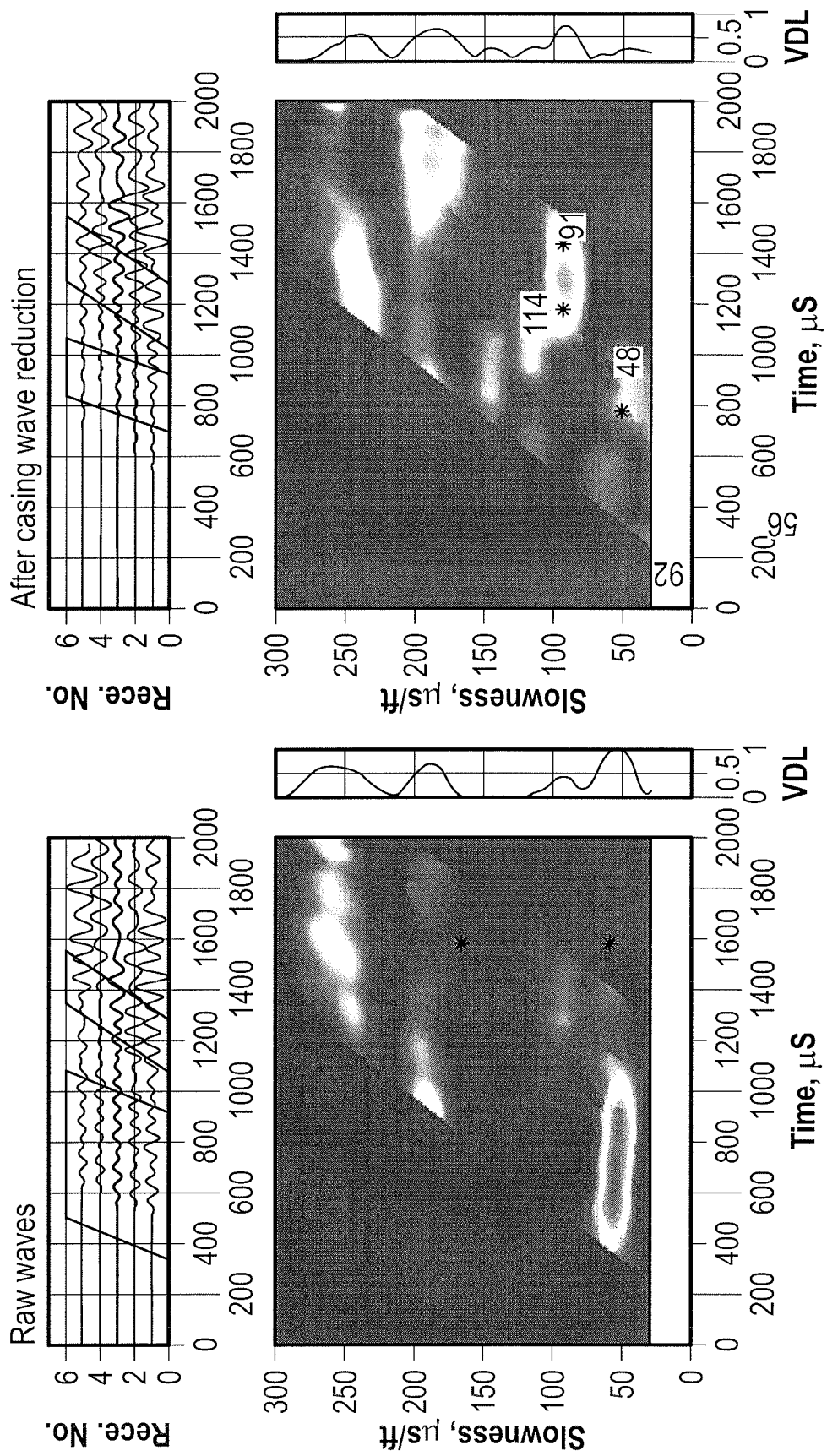
FIGS. 9A and 9B illustrate an exemplary semblance map of data captured from a free-casing zone, before and after application of the casing wave reduction method, according to one or more aspects of the present disclosure.

FIGS. 9A and 9B illustrate an exemplary semblance map of data captured from a free-casing zone. In FIG. 9A, the formation wave is obscured by the casing wave. For example, as shown, the amplitude of the casing wave in the semblance map, shown by the high amplitude at approximately 56 μs/ft and between times 400 μs and 1000 μs, overwhelms all other signals. After application of the casing wave reduction method described herein, a semblance map of the modified waveform, shown in FIG. 9B, shows the formation compressional wave with a slowness of approximately 90 μs/ft. This reduction in the casing waves is also apparent in the upper portions of FIG. 9. For example, the area between the first set of parallel lines in the upper portion of FIG. 9A is broader and shows higher amplitude waveforms, while the area between the first set of parallel lines in the upper portion of FIG. 9B is narrower and shows the substantially reduced amplitude of the casing waves.

Figures 10A, 10B:
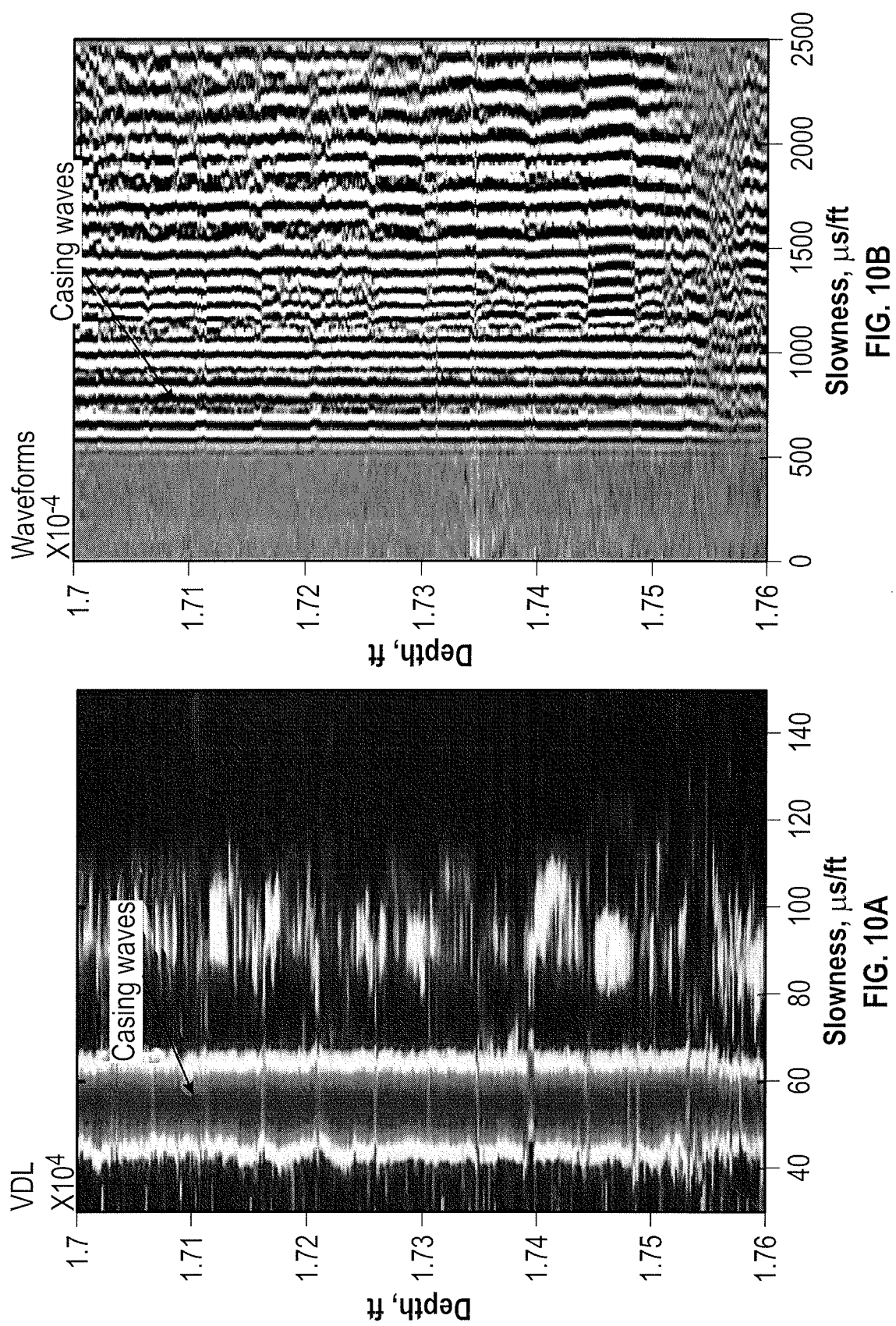
FIGS. 10A and 10B illustrate exemplary raw waveforms and semblance variable density log (VDL) of a free-casing zone, according to one or more aspects of the present disclosure.

FIGS. 10A and 10B illustrate exemplary raw waveforms and semblance of a free-casing zone. FIG. 10A shows the semblance VDL, where the high amplitude of the casing waves (shown as lighter portions) substantially obscure all other information. FIG. 10B similarly shows the raw waveforms, in which the casing waves, shown on the left portion of both figures, obscures all other information. FIGS. 11A and 11B illustrate exemplary modified waveforms and semblance VDL of a free-casing zone after application of the casing wave reduction method. FIGS. 11A and 11B illustrate the casing waves have been substantially reduced and the formation compressional waves are well estimated with the proposed method. As shown in FIG. 11A, the casing wave is no longer obscuring the formation compressional waves, which are now the highest amplitude signal shown in the VDL. Likewise, the raw waveforms shown in FIG. 11B are not obscured by the casing waves.

Any one or more embodiments of the present disclosure may be implemented through a computer-executable program of instructions, such as program modules, generally referred to as software applications or application programs executed by a computer. A software application may include, for example, routines, programs, objects, components, data structures, any other executable instructions, or any combination thereof, that perform particular tasks or implement particular abstract data types. The software application forms an interface to allow a computer to react according to a source of input. For example, an interface application may be used to implement any one or more embodiments of the present disclosure. The software application may also cooperate with other applications or code segments to initiate a variety of tasks based, at least in part, on data received, a source of data, or any combination thereof. Other applications or code segments may provide optimization components including, but not limited to, neural networks, earth modeling, history-matching, optimization, visualization, data management, and economics. The software application may be stored, carried, or both on any variety of memory such as CD-ROM, magnetic disk, optical disk, bubble memory, and semiconductor memory (for example, various types of RAM or ROM). Furthermore, the software application and one or more inputs or outputs may be transmitted over a variety of carrier media including, but not limited to wireless, wired, optical fiber, metallic wire, telemetry, any one or more networks (such as the Internet), or any combination thereof.

Moreover, those skilled in the art will appreciate that one or more of the embodiments may comprise a variety of computer-system configurations, including hand-held devices, multiprocessor systems, microprocessor-based or programmable consumer electronics, minicomputers, mainframe computers, and any combination thereof. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may, therefore, be implemented in connection with various hardware, software, or any combination thereof, in a computer system, information handling system, or other processing system.

FIG. 12 is a schematic diagram of example information handling system 1200, for example, for use with or in an associated wellbore environment 100 illustrated in FIGS. 1A-B. The information handling system 132 of FIGS. 1A-B may take a form similar to the information handling system 1200. A processor or central processing unit (CPU) 1201 of the information handling system 1200 is communicatively coupled to a memory controller hub (MCH) or north bridge 1202. The processor 1201 may include, for example a microprocessor, microcontroller, digital signal processor (DSP), application specific integrated circuit (ASIC), or any other digital or analog circuitry configured to interpret and/or execute program instructions and/or process data. Processor 1201 may be configured to interpret and/or execute program instructions or other data retrieved and stored in any memory such as memory 1203 or hard drive 1207. Program instructions or other data may constitute portions of a software or application, for example application 1258 or data 1254, for carrying out one or more methods described herein. Memory 1203 may include read-only memory (ROM), random access memory (RAM), solid state memory, or disk-based memory. Each memory module may include any system, device or apparatus configured to retain program instructions and/or data for a period of time (for example, non-transitory computer-readable media). For example, instructions from a software program or application 1258 or data 1254 may be retrieved and stored in memory 1203 for execution or use by processor 1201. In one or more embodiments, the memory 1203 or the hard drive 1207 may include or comprise one or more non-transitory executable instructions that, when executed by the processor 1201 cause the processor 1201 to perform or initiate one or more operations or steps. The information handling system 1200 may be preprogrammed or it may be programmed (and reprogrammed) by loading a program from another source (for example, from a CD-ROM, from another computer device through a data network, or in another manner).

The data 1254 may include treatment data, geological data, fracture data, microseismic data, or any other appropriate data. The one or more applications 1258 may include a fracture design model, a reservoir simulation tool, a fracture simulation model, or any other appropriate applications. In one or more embodiments, a memory of a computing device includes additional or different data, application, models, or other information. In one or more embodiments, the data 1254 may include treatment data relating to fracture treatment plans. For example the treatment data may indicate a pumping schedule, parameters of a previous injection treatment, parameters of a future injection treatment, or one or more parameters of a proposed injection treatment. Such one or more parameters may include information on flow rates, flow volumes, slurry concentrations, fluid compositions, injection locations, injection times, or other parameters. The treatment data may include one or more treatment parameters that have been optimized or selected based on numerical simulations of complex fracture propagation. In one or more embodiments, the data 1254 may include one or more signals received by one or more receivers 123 or receiver array 124 of FIGS. 1A-B, for example, data 1254 may comprise processed data 138 or data 130 as discussed above with respect to FIGS. 1A-B.

The one or more applications 1258 may comprise one or more software programs or applications, one or more scripts, one or more functions, one or more executables, or one or more other modules that are interpreted or executed by the processor 1201. For example, the one or more applications 1258 may include a fracture design module, a reservoir simulation tool, a hydraulic fracture simulation model, or any other appropriate function block. The one or more applications 1258 may include machine-readable instructions for performing one or more of the operations related to any one or more embodiments of the present disclosure. The one or more applications 1258 may include machine-readable instructions for generating a user interface or a plot, for example, illustrating fracture geometry (for example, length, width, spacing, orientation, etc.), pressure plot, hydrocarbon production performance. The one or more applications 1258 may obtain input data, such as treatment data, geological data, fracture data, or other types of input data, from the memory 1203, from another local source, or from one or more remote sources (for example, via the one or more communication links 1214). The one or more applications 1258 may generate output data and store the output data in the memory 1203, hard drive 1207, in another local medium, or in one or more remote devices (for example, by sending the output data via the communication link 1214).

Modifications, additions, or omissions may be made to FIG. 12 without departing from the scope of the present disclosure. For example, FIG. 12 shows a particular configuration of components of information handling system 1200. However, any suitable configurations of components may be used. For example, components of information handling system 1200 may be implemented either as physical or logical components. Furthermore, in some embodiments, functionality associated with components of information handling system 1200 may be implemented in special purpose circuits or components. In other embodiments, functionality associated with components of information handling system 1200 may be implemented in configurable general-purpose circuit or components. For example, components of information handling system 1200 may be implemented by configured computer program instructions.

Memory controller hub 1202 may include a memory controller for directing information to or from various system memory components within the information handling system 1200, such as memory 1203, storage element 1206, and hard drive 1207. The memory controller hub 1202 may be coupled to memory 1203 and a graphics processing unit (GPU) 1204. Memory controller hub 1202 may also be coupled to an I/O controller hub (ICH) or south bridge 1205. I/O controller hub 1205 is coupled to storage elements of the information handling system 1200, including a storage element 1206, which may comprise a flash ROM that includes a basic input/output system (BIOS) of the computer system. I/O controller hub 1205 is also coupled to the hard drive 1207 of the information handling system 1200. I/O controller hub 1205 may also be coupled to an I/O chip or interface, for example, a Super I/O chip 1208, which is itself coupled to several of the I/O ports of the computer system, including a keyboard 1209, a mouse 1210, a monitor 1212 and one or more communications link 1214. Any one or more input/output devices receive and transmit data in analog or digital form over one or more communication links 1214 such as a serial link, a wireless link (for example, infrared, radio frequency, or others), a parallel link, or another type of link. The one or more communication links 1214 may comprise any type of communication channel, connector, data communication network, or other link. For example, the one or more communication links 1214 may comprise a wireless or a wired network, a Local Area Network (LAN), a Wide Area Network (WAN), a private network, a public network (such as the Internet), a WiFi network, a network that includes a satellite link, or another type of data communication network.

A memory or storage device primarily stores one or more software applications or programs, which may also be described as program modules containing computer-executable instructions, which may be executed by the computing unit for implementing one or more embodiments of the present disclosure. The memory, therefore, may include one or more applications including, for example, a transmitter control application, a receiver control application, and a casing wave reduction application, which may enable one or more of the processes or sub-processes illustrated in FIG. 2 and may produce outputs like those shown in FIGS. 3, 5A, 5B, 6-8, 9A, 9B, 10A, 10B, and 11. These applications may integrate functionality from additional or third-party application programs or from system files stored in memory or on a storage device. An application may perform one or more of the steps in FIG. 2. System files, such as an ASCII text file may be used to store the instructions, data input, or both for the applications as may be required in, for example, one or more steps of FIG. 2. In certain embodiments, any one or more other applications may be used in combination. In certain embodiments, any one or more other applications may be used in combination may be used as stand-alone applications.

Although the computing device 1200 is shown as having one or more generalized memories, the computing device 1200 typically includes a variety of non-transitory computer readable media. By way of example, and not limitation, non-transitory computer readable media may comprise computer storage media and communication media. The memory may include computer storage media, such as a ROM and RAM in the form of volatile memory, nonvolatile memory, or both. A BIOS containing the basic routines that help to transfer information between elements within the computing unit, such as during start-up, is typically stored in the ROM. RAM typically contains data, program modules, other executable instructions, or any combination thereof that are immediately accessible to, presently being operated on, or both by the processing unit. By way of example, and not limitation, the computing device 1200 may include an operating system, application programs, other program modules, and program data.

The components shown in the memory may also be included in other removable/non-removable, volatile/non-volatile non-transitory computer storage media or the components may be implemented in the computing device 1200 through an application program interface ("API") or cloud computing, which may reside on a separate computing device coupled through a computer system or network (not shown). For example and without limitation, a hard disk drive may read from or write to non-removable, nonvolatile magnetic media, a magnetic disk drive may read from or write to a removable, nonvolatile magnetic disk, and an optical disk drive may read from or write to a removable, nonvolatile optical disk such as a CD-ROM or other optical media. Other removable/non-removable, volatile/nonvolatile computer storage media that may be used in the exemplary operating environment may include, but are not limited to, magnetic tape cassettes, flash memory cards, digital versatile disks, digital video tape, solid state RAM, solid state ROM, or the like. The drives and their associated computer storage media discussed above provide storage of computer readable instructions, data structures, program modules, and other data for the computing unit.

The computing device 1200 may receive commands or information from a user through one or more input devices such as the keyboard 1209 and the mouse 1210. Additional input devices may comprise a microphone, joystick, touch-screen, scanner, voice or gesture recognition, one or more sensors including one or more seismic sensors, and the like (not shown). These and other input devices may be coupled to the processing unit through the Super I/O chip 1208 that is coupled to the ICH 1205, but may be coupled by other interface and bus structures, such as a parallel port or a universal serial bus (USB) (not shown).

A monitor or other type of display device (not shown) may be coupled to the MCH 1202 via an interface, such as the GPU 1204 or via Super I/O chip 1208. A graphical user interface ("GUI") may also be used with the video interface 1204 to receive instructions from a user and transmit instructions to the central processing unit 1201. A GUI may be used to display the outputs of the processes described in FIG. 2, including without limitation FIGS. 3, 5A, 5B, 6-8, 9A, 9B, 10A, 10B, and 11, and may be used to prompt or display modification of subsurface operations or production activities. The computing device 1200 may comprise peripheral output devices such as speakers, printer, external memory, any other device, or any combination thereof, which may be coupled through any output peripheral interface.

Any one or more input/output devices may receive and transmit data in analog or digital form over one or more communication links 1214 such as a serial link, a wireless link (for example, infrared, radio frequency, or others), a parallel link, or another type of link. The one or more communication links 1214 may comprise any type of communication channel, connector, data communication network, or other link. For example, the one or more communication links 1214 may comprise a wireless or a wired network, a Local Area Network (LAN), a Wide Area Network (WAN), a private network, a public network (such as the Internet), a wireless fidelity or WiFi network, a network that includes a satellite link, or another type of data communication network.

Although many other internal components of the computing device 1200 are not shown, those of ordinary skill in the art will appreciate that such components and their interconnection are well known.

In one or more embodiments, a method for reducing casing wave effects on sonic logging data comprises positioning two or more receivers in a borehole in a subsurface formation; receiving, at the two or more receivers, a first one or more received signals, wherein the first one or more received signals are associated with a first acoustic signal, and wherein the first acoustic signal originates from a first transmitter position; receiving, at the two or more receivers, a second one or more received signals, wherein the second one or more received signals are associated with a second acoustic signal, and wherein the second acoustic signal originates from a second transmitter position; creating a dataset based on the first one or more received signals and the second one or more received signals; identifying one or more casing wave signals in the dataset based at least in part on the second one or more received signals; calculating one or more inverse-phase casing wave signals based at least in part on the one or more casing wave signals and the second one or more received signals; and reducing one or more effects of the one or more casing wave signals on the dataset using the one or more inverse-phase casing wave signals.

In one or more embodiments, the calculating one or more inverse-phase casing wave signals based at least in part on the one or more casing wave signals further comprises extracting one or more of wave slowness and attenuation of the one or more casing waves signals in the dataset. In one or more embodiments, the method further comprises semblance processing the dataset. In one or more embodiments, the method further comprises identifying one or more formation wave signals in the dataset, and extracting one or more of wave slowness and amplitude of the one or more formation wave signals based at least in part on the semblance processing the dataset. In one or more embodiments, the method further comprises compensating for one or more amplitude reductions to the formation wave signals in the dataset resulting from the reducing one or more effects of the one or more casing wave signals on the dataset using the one or more inverse-phase casing wave signals. In one or more embodiments, the method further comprises receiving, at the two or more receivers, a third one or more received signals, wherein the third one or more received signals are associated with a third acoustic signal, and wherein the third acoustic signal originates from a third transmitter position; and modifying the dataset based on the third one or more received signals. In one or more embodiments, the method further comprises interpolating a third one or more received signals based at least in part on the dataset.

In one or more embodiments, a non-transitory computer readable medium for storing one or more instructions that, when executed, causes a processor to: receive, from two or more receivers, a first one or more signals, wherein the first one or more signals are associated with a first acoustic signal, and wherein the first acoustic signal originates from a first transmitter position; receive, from two or more receivers, a second one or more signals, wherein the second one or more signals are associated with a second acoustic signal, and wherein the second acoustic signal originates from a second transmitter position; create a dataset based on the first one or more received signals and the second one or more received signals; identify one or more casing wave signals in the dataset based at least in part on the second one or more received signals; calculate one or more inverse-phase casing wave signals based at least in part on the one or more casing wave signals and the second one or more received signals; and reduce one or more effects of the one or more casing wave signals on the dataset using the one or more inverse-phase casing wave signals.

In one or more embodiments, the one or more instructions, when executed, further cause the processor to extract one or more of wave slowness and attenuation of one or more casing waves from the dataset. In one or more embodiments, the one or more instructions, when executed, further cause the processor to extract one or more of wave slowness and amplitude of one or more formation wave signals from the dataset. In one or more embodiments, the one or more instructions, when executed, further cause the processor to compensate for one or more amplitude reductions to the dataset resulting from the reducing one or more effects of the one or more casing wave signals on the dataset using the one or more inverse-phase casing wave signals. In one or more embodiments, the one or more instructions, when executed, further cause the processor to receive, from the two or more receivers, a third one or more received signals, wherein the third one or more received signals are associated with a third acoustic signal, wherein the third acoustic signal originates from a third transmitter position; and modify the dataset based on the third one or more received signals. In one or more embodiments, the one or more instructions, when executed, further cause the processor to interpolate a third one or more received signals based at least in part on the dataset.

In one or more embodiments, a system for reducing casing wave effects on sonic logging data comprises a sonic tool disposed within a borehole within a subsurface formation, wherein the sonic tool comprises: one or more transmitters; two or more receivers; and an information handling system coupled to the one or more transmitters and the two or more receivers, wherein the information system comprises a processor, and a non-transitory computer readable medium for storing one or more instructions that, when executed, causes the processor to: prompt the one or more transmitters to transmit a first acoustic signal at a first transmitter position; collect from the two or more receivers a first one or more received signals, wherein the first one or more received signals are associated with the first acoustic signal; prompt the one or more transmitters to transmit a second acoustic signal at a second transmitter position; collect from the two or more receivers a second one or more received signals, wherein the second one or more received signals are associated with the second acoustic signal; create a dataset based on the first one or more received signals and the second one or more received signals; identify one or more casing wave signals in the dataset based at least in part on the second one or more received signals; calculate one or more inverse-phase waves based at least in part on the one or more casing wave signals and the second one or more received signals; and reduce the one or more casing wave signals in the dataset using the one or more inverse-phase waves.

In one or more embodiments, the one or more instructions, when executed, further cause the processor to extract one or more of wave slowness and amplitude of one or more formation wave signals from the dataset. In one or more embodiments, the one or more instructions, when executed, further cause the processor to extract one or more of wave slowness and attenuation of one or more casing waves from the dataset. In one or more embodiments, the one or more instructions, when executed, further cause the processor to compensate for one or more amplitude reductions to the dataset resulting from the reducing one or more effects of the one or more casing wave signals on the dataset using the one or more inverse-phase casing wave signals. In one or more embodiments, the one or more instructions, when executed, further cause the processor to interpolate a third one or more received signals based at least in part on the dataset. In one or more embodiments, the one or more instructions, when executed, further cause the processor to: prompt the one or more transmitters to transmit a third acoustic signal; collect, from the two or more receivers, a third one or more received signals, wherein the third one or more received signals are associated with the third acoustic signal; and modify the dataset based on the third one or more received signals. In one or more embodiments, the sonic tool comprises one or more of a logging-while-drilling tool, a measurement-while-drilling, and a wireline tool.

In one or more embodiments, a method for reducing casing wave effects on sonic logging data comprises positioning two or more receivers in a borehole in a subsurface formation; receiving, at the two or more receivers, a first one or more received signals, wherein the first one or more received signals are associated with a first acoustic signal, and wherein the first acoustic signal originates from a first transmitter position; receiving, at the two or more receivers, a second one or more received signals, wherein the second one or more received signals are associated with a second acoustic signal, and wherein the second acoustic signal originates from a second transmitter position; creating a dataset based on the first one or more received signals and the second one or more received signals; identifying one or more casing wave signals in the dataset; calculating one or more inverse-phase casing wave signals based at least in part on the one or more casing wave signals; and reducing one or more effects of the one or more casing wave signals on the dataset using the one or more inverse-phase casing wave signals.

In one or more embodiments, the calculating one or more inverse-phase casing wave signals based at least in part on the one or more casing wave signals further comprises extracting one or more of wave slowness and attenuation of the one or more casing waves signals in the dataset. In one or more embodiments, the method further comprises semblance processing the dataset. In one or more embodiments, the method further comprises extracting one or more of wave slowness and amplitude of one or more formation wave signals from the dataset based at least in part on the semblance processing the dataset. In one or more embodiments, the method further comprises compensating for one or more amplitude reductions to the formation wave signals in the dataset resulting from the reducing one or more effects of the one or more casing wave signals on the dataset using the one or more inverse-phase casing wave signals. In one or more embodiments, the method further comprises identifying one or more formation wave signals in the dataset, and extracting one or more fluids from the subsurface formation based at least in part on the identification of the one or more formation wave signals. In one or more embodiments, the method further comprises receiving, at the two or more receivers, a third one or more received signals, wherein the third one or more received signals are associated with a third acoustic signal, and wherein the third acoustic signal originates from a third transmitter position; and modifying the dataset based on the third one or more received signals. In one or more embodiments, the method further comprises interpolating a third one or more received signals based at least in part on the dataset.

In one or more embodiments, a non-transitory computer readable medium for storing one or more instructions that, when executed, causes a processor to: receive, from two or more receivers, a first one or more signals, wherein the first one or more signals are associated with a first acoustic signal, and wherein the first acoustic signal originates from a first transmitter position; receive, from two or more receivers, a second one or more signals, wherein the second one or more signals are associated with a second acoustic signal, and wherein the second acoustic signal originates from a second transmitter position; create a dataset based on the first one or more received signals and the second one or more received signals; identify one or more casing wave signals in the dataset; calculate one or more inverse-phase casing wave signals based at least in part on the one or more casing wave signals; and reduce one or more effects of the one or more casing wave signals on the dataset using the one or more inverse-phase casing wave signals.

In one or more embodiments, the one or more instructions, when executed, further cause the processor to extract one or more of wave slowness and attenuation of one or more casing waves from the dataset. In one or more embodiments, the one or more instructions, when executed, further cause the processor to extract one or more of wave slowness and amplitude of one or more formation wave signals from the dataset. In one or more embodiments, the one or more instructions, when executed, further cause the processor to compensate for one or more amplitude reductions to the dataset resulting from the reducing one or more effects of the one or more casing wave signals on the dataset using the one or more inverse-phase casing wave signals. In one or more embodiments, the one or more instructions, when executed, further cause the processor to receive, from the two or more receivers, a third one or more received signals, wherein the third one or more received signals are associated with a third acoustic signal, wherein the third acoustic signal originates from a third transmitter position; and modify the dataset based on the third one or more received signals. In one or more embodiments, the one or more instructions, when executed, further cause the processor to interpolate a third one or more received signals based at least in part on the dataset.

In one or more embodiments, a system for reducing casing wave effects on sonic logging data, the method comprising: a sonic tool disposed within a borehole within a subsurface formation, wherein the sonic tool comprises: one or more transmitters; two or more receivers; an information handling system coupled to the one or more transmitters and the two or more receivers, the information system comprising: a processor, and a non-transitory computer readable medium for storing one or more instructions that, when executed, causes the processor to: prompt the one or more transmitters to transmit a first acoustic signal at a first transmitter position; collect from the two or more receivers a first one or more received signals, wherein the first one or more received signals are associated with the first acoustic signal; prompt the one or more transmitters to transmit a second acoustic signal at a second transmitter position; collect from the two or more receivers a second one or more received signals, wherein the second one or more received signals are associated with the second acoustic signal; create a dataset based on the first one or more received signals and the second one or more received signals; identify one or more casing wave signals in the dataset; calculate one or more inverse-phase waves based at least in part on the one or more casing wave signals; and reduce the one or more casing wave signals in the dataset using the one or more inverse-phase waves.

In one or more embodiments, the one or more instructions, when executed, further cause the processor to extract one or more of wave slowness and amplitude of one or more formation wave signals from the dataset. In one or more embodiments, the one or more instructions, when executed, further cause the processor to extract one or more of wave slowness and attenuation of one or more casing waves from the dataset. In one or more embodiments, the one or more instructions, when executed, further cause the processor to compensate for one or more amplitude reductions to the dataset resulting from the reducing one or more effects of the one or more casing wave signals on the dataset using the one or more inverse-phase casing wave signals. In one or more embodiments, the one or more instructions, when executed, further cause the processor to interpolate a third one or more received signals based at least in part on the dataset. In one or more embodiments, the one or more instructions, when executed, further cause the processor to prompt the one or more transmitters to transmit a third acoustic signal; collect, from the two or more receivers, a third one or more received signals, wherein the third one or more received signals are associated with the third acoustic signal; and modify the dataset based on the third one or more received signals. In one or more embodiments, the sonic tool comprises one or more of a logging-while-drilling tool, a measurement-while-drilling, and a wireline tool.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof. In particular, with regards to the methods disclosed, one or more steps may not be required in all embodiments of the methods and the steps disclosed in the methods may be performed in a different order than was described. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (for example, "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method for reducing casing wave effects on sonic logging data, the method comprising:
    positioning two or more receivers in a borehole in a subsurface formation;
    receiving, at the two or more receivers, a first one or more received signals, wherein the first one or more received signals are associated with a first acoustic signal, and wherein the first acoustic signal originates from a first transmitter position;
    receiving, at the two or more receivers, a second one or more received signals, wherein the second one or more received signals are associated with a second acoustic signal, and wherein the second acoustic signal originates from a second transmitter position;
    creating a dataset based on the first one or more received signals and the second one or more received signals;
    identifying one or more casing wave signals in the dataset based at least in part on the second one or more received signals;
    calculating one or more inverse-phase casing wave signals based at least in part on the one or more casing wave signals and the second one or more received signals; and
    reducing one or more effects of the one or more casing wave signals on the dataset using the one or more inverse-phase casing wave signals.

2. The method of claim 1, wherein the calculating one or more inverse-phase casing wave signals based at least in part on the one or more casing wave signals further comprises extracting one or more of wave slowness and attenuation of the one or more casing waves signals in the dataset.

3. The method of claim 1, further comprising semblance processing the dataset.

4. The method of claim 3, further comprising identifying one or more formation wave signals in the dataset, and extracting one or more of wave slowness and amplitude of the one or more formation wave signals based at least in part on the semblance processing the dataset.

5. The method of claim 1, further comprising compensating for one or more amplitude reductions to one or more formation wave signals in the dataset resulting from the reducing one or more effects of the one or more casing wave signals on the dataset using the one or more inverse-phase casing wave signals.

6. The method of claim 1, further comprising receiving, at the two or more receivers, a third one or more received signals, wherein the third one or more received signals are associated with a third acoustic signal, and wherein the third acoustic signal originates from a third transmitter position; and modifying the dataset based on the third one or more received signals.

7. The method of claim 1, further comprising interpolating a third one or more received signals based at least in part on the dataset.

8. A non-transitory computer readable medium for storing one or more instructions that, when executed, causes a processor to:
    receive, from two or more receivers, a first one or more signals, wherein the first one or more signals are associated with a first acoustic signal, and wherein the first acoustic signal originates from a first transmitter position;
    receive, from two or more receivers, a second one or more signals, wherein the second one or more signals are associated with a second acoustic signal, and wherein the second acoustic signal originates from a second transmitter position;

create a dataset based on the first one or more received signals and the second one or more received signals;

identify one or more casing wave signals in the dataset based at least in part on the second one or more received signals;

calculate one or more inverse-phase casing wave signals based at least in part on the one or more casing wave signals and the second one or more received signals; and reduce one or more effects of the one or more casing wave signals on the dataset using the one or more inverse-phase casing wave signals.

9. The non-transitory computer readable medium for storing one or more instructions of claim 8 that, when executed, further causes the processor to extract one or more of wave slowness and attenuation of one or more casing waves from the dataset.

10. The non-transitory computer readable medium for storing one or more instructions of claim 8 that, when executed, further causes the processor to extract one or more of wave slowness and amplitude of one or more formation wave signals from the dataset.

11. The non-transitory computer readable medium for storing one or more instructions of claim 8 that, when executed, further causes the processor to compensate for one or more amplitude reductions to the dataset resulting from the reducing one or more effects of the one or more casing wave signals on the dataset using the one or more inverse-phase casing wave signals.

12. The non-transitory computer readable medium for storing one or more instructions of claim 8 that, when executed, further causes the processor to receive, from the two or more receivers, a third one or more received signals, wherein the third one or more received signals are associated with a third acoustic signal, wherein the third acoustic signal originates from a third transmitter position; and modify the dataset based on the third one or more received signals.

13. The non-transitory computer readable medium for storing one or more instructions of claim 8 that, when executed, further causes the processor to interpolate a third one or more received signals based at least in part on the dataset.

14. A system for reducing casing wave effects on sonic logging data, the system comprising:

a sonic tool disposed within a borehole within a subsurface formation, wherein the sonic tool comprises:
one or more transmitters;
two or more receivers;
an information handling system coupled to the one or more transmitters and the two or more receivers, the information handling system comprising:
a processor, and
a non-transitory computer readable medium for storing one or more instructions that, when executed, causes the processor to:
prompt the one or more transmitters to transmit a first acoustic signal at a first transmitter position;
collect from the two or more receivers a first one or more received signals, wherein the first one or more received signals are associated with the first acoustic signal;
prompt the one or more transmitters to transmit a second acoustic signal at a second transmitter position;
collect from the two or more receivers a second one or more received signals, wherein the second one or more received signals are associated with the second acoustic signal;
create a dataset based on the first one or more received signals and the second one or more received signals;
identify one or more casing wave signals in the dataset based at least in part on the second one or more received signals;
calculate one or more inverse-phase waves based at least in part on the one or more casing wave signals and the second one or more received signals; and
reduce the one or more casing wave signals in the dataset using the one or more inverse-phase waves.

15. The system of claim 14, wherein the non-transitory computer readable medium for storing one or more instructions that, when executed, further causes the processor to extract one or more of wave slowness and amplitude of one or more formation wave signals from the dataset.

16. The system of claim 14, wherein the non-transitory computer readable medium for storing one or more instructions that, when executed, further causes the processor to extract one or more of wave slowness and attenuation of one or more casing waves from the dataset.

17. The system of claim 14, wherein the non-transitory computer readable medium for storing one or more instructions that, when executed, further causes the processor to compensate for one or more amplitude reductions to the dataset resulting from the reducing one or more effects of the one or more casing wave signals on the dataset using the one or more inverse-phase waves.

18. The system of claim 14, wherein the non-transitory computer readable medium for storing one or more instructions that, when executed, further causes the processor to interpolate a third one or more received signals based at least in part on the dataset.

19. The system of claim 14, wherein the non-transitory computer readable medium for storing one or more instructions that, when executed, further causes the processor to:
prompt the one or more transmitters to transmit a third acoustic signal;
collect, from the two or more receivers, a third one or more received signals, wherein the third one or more received signals are associated with the third acoustic signal; and
modify the dataset based on the third one or more received signals.

20. The system of claim 14, wherein the sonic tool comprises one or more of a logging-while-drilling tool, a measurement-while-drilling, and a wireline tool.

* * * * *